US005624999A

United States Patent [19]
Lombardi et al.

[11] Patent Number: 5,624,999
[45] Date of Patent: Apr. 29, 1997

[54] MANUFACTURE OF FUNCTIONALIZED POLYMERS

[75] Inventors: Alessandro Lombardi, Abingdon, United Kingdom; Geraldo Barini, Livorno, Italy; Carmine D'Antonio, Bergeggi, Italy; Stefano Gusi, Bologna, Italy

[73] Assignee: Exxon Chemical Patents Inc., Linden, N.J.

[21] Appl. No.: 438,623

[22] Filed: May 12, 1995

Related U.S. Application Data

[63] Continuation of Ser. No. 108,685, filed as PCT/EP92/00494, Mar. 4, 1992 published as WO92/15622, Sep. 17, 1992, abandoned.

[30] Foreign Application Priority Data

Mar. 5, 1991 [GB] United Kingdom ............ 9104647

[51] Int. Cl.⁶ .................. C08F 255/00; C08F 259/02
[52] U.S. Cl. .................. 525/52; 525/53; 525/285; 525/319
[58] Field of Search ................ 525/52, 53, 285, 525/319

[56] References Cited

U.S. PATENT DOCUMENTS

| | | | |
|---|---|---|---|
| 2,862,947 | 12/1958 | Goldsmith | 260/461 |
| 2,882,149 | 4/1959 | Willems | 92/20 |
| 3,086,849 | 4/1963 | Goldsmith | 23/260 |
| 3,912,764 | 10/1975 | Palmer, Jr. | 260/346.8 |
| 3,980,569 | 9/1976 | Pindar et al. | 252/51.5 R |
| 4,116,876 | 9/1978 | Brois et al. | 252/49.6 |
| 4,379,836 | 4/1983 | Schnoring et al. | 430/377 |
| 4,511,414 | 4/1985 | Matsui et al. | 149/109.6 |
| 4,985,208 | 1/1991 | Sugawara et al. | 422/135 |
| 5,011,618 | 4/1991 | Papke et al. | 252/33 |
| 5,162,445 | 11/1992 | Powers et al. | 525/333.4 |

FOREIGN PATENT DOCUMENTS

| | | |
|---|---|---|
| 0189093A3 | 7/1986 | European Pat. Off. . |
| 263703 | 4/1988 | European Pat. Off. ..... C10M 159/12 |
| 263702 | 4/1988 | European Pat. Off. ..... C10M 145/22 |
| 304175 | 2/1989 | European Pat. Off. ..... C10M 159/16 |
| 353935 | 2/1990 | European Pat. Off. ..... C10M 129/93 |
| 0367385A2 | 5/1990 | European Pat. Off. . |
| 1028809 | 5/1953 | France . |
| 2612800 | 9/1988 | France . |
| 278799 | 8/1912 | Germany . |
| 915047 | 1/1963 | United Kingdom . |
| 1112174 | 5/1968 | United Kingdom . |
| 1356921 | 6/1974 | United Kingdom . |
| 1358157 | 6/1974 | United Kingdom . |
| 1498786 | 1/1978 | United Kingdom . |
| 1555774 | 11/1979 | United Kingdom . |
| 2062091 | 5/1981 | United Kingdom . |
| 2106407 | 4/1983 | United Kingdom . |
| 2192558 | 1/1988 | United Kingdom . |
| 2194166 | 3/1988 | United Kingdom . |
| 2194239 | 3/1988 | United Kingdom . |

OTHER PUBLICATIONS

IKA Brochure, "IKA Ultra-Turrax Dispersers," pp. 1–4 and pp. 6–7, published before 1991.

*Primary Examiner*—Carman J. Seccuro, Jr.
*Attorney, Agent, or Firm*—Kenneth R. Walton; Mary M. Allen

[57] ABSTRACT

A functionalised polymer, especially an ashless dispersant or a viscosity index improver dispersant, suitable for use as a lubricating or fuel oil additive, or as an intermediate for use in the manufacture of such an additive, is prepared from reactants in different phases by reacting the reactants in a reaction region defined by adjacent surfaces between which there is relative movement or in a thin film on a surface over which they move.

24 Claims, 3 Drawing Sheets

MANUFACTURE OF FUNCTIONALIZED POLYMERS

This is a continuation, of application Ser. No. 108,685, filed September 3, 1993 now abandoned based on PCT/EP92/00494, filed Mar. 4, 1992 and GB 9104647filed Mar. 5, 1991.

The invention relates to improvements in the manufacture of functionalised polymers suitable for use as lubricating or fuel oil additives or as intermediates suitable for use in the manufacture of such additives.

For the past 30 to 50 years, lubricating oils used as crankcase lubricants in internal combustion engines in automobiles and trucks have normally contained ashless dispersants, for example, the reaction products of amines and/or alcohols, including amino-alcohols, with hydrocarbyl-substituted mono-or dicarboxylic acids, long chain aliphatic hydrocarbons having one or more polyamine molecules attached directly thereto, and Mannich condensation products containing a long chain hydrocarbyl group, for example, as a substituent of a phenol. Crankcase lubricants may in addition, or alternatively, contain viscosity index modifier dispersants (sometimes called multifunctional viscosity modifiers), which have both viscosity index modifying and dispersant properties. Ashless dispersants and/or viscosity index modifier dispersants are frequently also used in other lubricating oil compositions, and ashless dispersants may also be used in fuels.

Ashless dispersants and viscosity index modifier dispersants normally comprise a polymeric group and at least one functional group, the functional group(s) being such that the functionalised polymer has dispersant properties. (Functionalised polymers are sometimes referred to as "derivatised" polymers. A functional group, for the purposes of this specification, is a group such that a functionalised polymer containing it has chemical properties which differ from those of the polymer itself.)

In view of the very considerable commercial importance of ashless dispersants and viscosity index modifier dispersants, many different proposals have been made over many years for improving processes for their manufacture. Despite the very considerable work that has been carded out in this field, however, the applicants have found that it is possible, in a relatively simple manner, to make very significant improvements in manufacture of functionalised polymers and, in particular, in the manufacture of ashless dispersants and viscosity index modifier dispersants.

The invention provides a process for the manufacture of a functionalised polymer suitable for use as a lubricating or fuel oil additive, or as an intermediate for use in the manufacture of such an additive, in which process a first reactant is present in a different phase from a second reactant and the said reactants are reacted in a region defined by a surface and at least one member adjacent to the surface, there being relative movement between the surface and the member(s) such that the reactants are caused to move relative to the surface. Advantageously, the region is defined by adjacent surfaces between which there is relative movement such that the reactants are caused to move relative to one or both of the surfaces.

The invention also provides a process for the manufacture of a functionalised polymer suitable for use as a lubricating or fuel oil additive, or as an intermediate for use in the manufacture of such an additive, in which process a first reactant is present in a different phase from a second reactant and the reactants are reacted in a thin film on a surface over which they move, the average velocity (taken across the thickness of the film ) of a mixture of the reactants in a direction parallel to the surface being at least 1 m/sec. The thin film is advantageously formed between the surface and at least one member adjacent to the surface, preferably between adjacent surfaces, there being relative movement between the surface and the member(s), or between the surfaces, causing the said movement of the reactants.

The invention also provides functionalised polymers, especially ashless dispersants or viscosity index improver dispersants, or intermediates suitable for use in the preparation of such compounds, manufactured by a process in accordance with the invention.

As indicated above, the invention has particular relevance to the manufacture of ashless dispersants and viscosity index modifier dispersants. The invention thus move particularly provides a process in which an ashless dispersant, or a viscosity index modifier dispersant, suitable for use as a lubricating or fuel oil additive, or an intermediate for use in the manufacture of such an ashless dispersant or viscosity index is manufactured by a process as defined above.

Dispersants maintain oil-insoluble substances, e.g. resulting from wear or oxidation in use, in suspension, thus, for example, preventing sludge flocculation and precipitation or deposition on metal parts. Ashless dispersants are so called because despite the fact that, depending on their constitution, they may upon combustion yield a non-volatile material such as boric oxide or phosphorus pentoxide, they do not ordinarily contain metal and therefore do not yield a metal-containing ash on combustion, in contrast to metal-containing (and thus ash-forming) detergents. Many types of ashless dispersants are known in the art, including the following:

1. Reaction products of carboxylic acids (or derivatives thereof) containing at least about 30, and preferably at least about 50, carbon atoms with nitrogen-containing compounds (for example, amines), organic hydroxy compounds (for example phenols and alcohols), and/or basic inorganic materials. Examples of these "carboxylic dispersants" are described, for example, in British Patent No. 1,306,529 and in U.S. Pat. Nos. 3,272,746, 3,341,542, 3,454,607 and 4,654,403. The term "carboxylic dispersants" as used herein also includes, where appropriate, such carboxylic acids, and derivatives thereof, which have not been reacted as indicated above.

More specifically, nitrogen- or ester-containing ashless dispersants include oil-soluble salts, amides, imides, oxazolines and esters, or mixtures thereof, of long chain hydrocarbyl-substituted mono- and dicarboxylic acids or derivatives, particularly anhydride or ester derivatives, thereof wherein said long chain hydrocarbyl group is a polymer, typically of a $C_2$ to $C_{10}$, e.g. $C_2$ to $C_5$, monoolefin, said polymer having a number average molecular weight of from about 700 to 5000.

Monocarboxylic acid dispersants have been described in, for example, British Patent No. 983 040 and Belgian Patent No. 658 236.

Long chain hydrocarbyl-substituted dicarboxylic acid material which can be used to make a carboxylic dispersant includes the reaction product of a long chain hydrocarbon polymer, generally a polyolefin, with (i) a monounsaturated $C_4$ to $C_{10}$ dicarboxylic acid wherein (a) the carboxyl groups are vicinyl, (i.e. located on adjacent carbon atoms) and (b) at least one, preferably both, of said adjacent carbon atoms are part of said mono unsaturation; or with (ii) a derivative of (i), for example, an anhydride or a $C_1$ to $C_5$ alcohol-derived mono-or diester of (i). Upon reaction with the hydrocarbon polymer, the monounsaturation of the dicarboxylic acid material becomes saturated. Thus, for example, maleic anhydride becomes a hydrocarbyl-substituted succinic anhydride.

Typically, from about 0.7 to about 4.0 (e.g. 0.8 to 2.6), preferably from about 1.0 to about 2.0, and most preferably from about 1.1 to about 1.7 moles of the unsaturated $C_4$ to $C_{10}$ dicarboxylic acid material are charged to the reactor per mole of polyolefin charged.

Normally, not all of the polyolefin reacts with the unsaturated acid or derivative and the hydrocarbyl-substituted dicarboxylic acid material will contain unreacted polyolefin. The unreacted polyolefin is typically not removed from the reaction mixture (because such removal is difficult and would be commercially unfeasible) and the product mixture, stripped of any unreacted monounsaturated $C_4$ to $C_{10}$ dicarboxylic acid material, is employed for further reaction with the amine or alcohol as described hereinafter to make the dispersant.

Characterization of the average number of moles of dicarboxylic acid, anhydride or ester which have reacted per mole of polyolefin charged to the reaction (whether it has undergone reaction or not) is defined herein as functionality. Said functionality is based upon (i) determination of the saponification number of the resulting product mixture using potassium hydroxide; and (ii) the number average molecular weight of the polymer charged using any suitable technique. Functionality is defined solely with reference to the resulting product mixture. Consequently, although the amount of said reacted polyolefin contained in the resulting product mixture can be subsequently modified, i.e. increased or decreased, such modifications do not alter functionality as defined above. The term hydrocarbyl-substituted dicarboxylic acid material is intended to refer to the product mixture whether it has undergone such modification or not.

Accordingly, the functionality of the hydrocarbyl-substituted dicarboxylic acid material will be typically at least about 0.5, preferably at least about 0.8, and most preferably at least about 0.9, and can vary typically from about 0.5 to about 2.8 (e.g. 0.6 to 2), preferably from about 0.8 to about 1.4, and most preferably from about 0.9 to about 1.3.

Exemplary of unsaturated mono and dicarboxylic acids, which may be used as such, or in the form of derivatives, in the manufacture of dispersants are fumaric acid, itaconic acid, maleic acid, maleic anhydride, chloromaleic add, chloromaleic anhydride, acrylic acid, methacrylic acid, crotonic add, and cinnamic acid.

Preferred olefin polymers for reaction with the unsaturated carboxylic adds or derivatives thereof are polymers comprising a major molar amount of units derived from $C_2$ to $C_{10}$, e.g. $C_2$ to $C_5$ monoolefins. Such olefins include ethylene, propylene, butylene, isobutylene, pentene, octene-1, and styrene. The polymers can be homopolymers for example, polyisobutylene, as well as interpolymers of two or more of such olefins, for example interpolymers of: ethylene and propylene; butylene and isobutylene; or propylene and isobutylene. Other interpolymers include those in which a minor molar amount of the copolymerisable monomers, e.g. 1 to 10 mole %, is a $C_4$ to $C_{18}$ non-conjugated diolefin, e.g. an intercopolymer of isobutylene and butadiene: or an interpolymer of ethylene, propylene and 1,4-hexadiene.

In some cases, the olefin polymer may be completely saturated, for example an ethylene-propylene interpolymer made by a Ziegler-Natta synthesis using hydrogen as a moderator to control molecular weight.

The olefin polymers used in the manufacture of dispersants will usually have number average molecular weights within the range of about 700 and about 5000, more usually between about 800 and about 3000. Particularly useful olefin polymers have number average molecular weights within the range of about 900 and about 2500 with approximately one terminal double bond per polymer chain. An especially useful starting material for highly potent dispersant additives is polyisobutylene. The use of poly-n-butene may also be very advantageous in some circumstances. The number average molecular weight for such polymers can be determined by any suitable technique. A convenient method for such determination is by gel permeation chromatography (GPC) which additionally provides molecular weight distribution information, see W. W. Yau, J. J. Kirkland and D. D. Bly, "Modern Size Exclusion Liquid Chromatography", John Wiley and Sons, New York, 1979.

Any suitable process may be used for reacting the olefin polymer with the $C_{4-10}$ unsaturated carboxylic acid or derivative thereof. For example, the olefin polymer and the carboxylic acid or derivative may simply be heated together as disclosed in U.S. Pat. Nos. 3,361,673 and 3,401,118 to cause a thermal "ene" reaction to take place. Alternatively, the olefin polymer can be first be halogenated, for example, chlorinated or brominated to about 1 to 8 wt. %, preferably 3 to 7 wt. % chlorine, or bromine, based on the weight of polymer, by passing the chlorine or bromine through the polyolefin at an elevated temperature. The halogenated polymer may then be reacted with sufficient unsaturated add or derivative so the product obtained will contain the desired number of moles of the unsaturated add or derivative per mole of the halogenated polymer. Processes of this general type are taught in U.S. Pat. Nos. 3,087,936, 3,172,892, 3,272,746 and others.

Alternatively, the olefin polymer, and the unsaturated add or derivative are mixed and heated while adding chlorine to the hot material. Processes of this type are disclosed in U.S. Pat. Nos. 3,215,707, 3,231,587, 3,912,764, 4,110,349, and in U.K. 1,440,219.

By the use of halogen, about 65 to 95 wt. % of the polyolefin, e.g. polyisobutylene will normally react with a dicarboxylic acid or derivative. Upon carrying out a thermal reaction without the use of halogen or a catalyst, then usually only about 50 to 75 wt. % of the polyisobutylene will react. Chlorination helps increase the reactivity.

In the manufacture of a carboxylic dispersant, at least one hydrocarbylsubstituted carboxylic acid material is advantageously mixed with, for example, at least one substance selected from amines, alcohols, including polyols, and aminoalcohols. When the acid material is further reacted, e.g. neutralized, then generally a major proportion of at least 50% of the acid-producing units up to all the acid units will be reacted.

Amine compounds useful as nucleophilic reactants for neutralization of the hydrocarbyl-substituted carboxylic acid materials include mono- and (preferably) polyamines, most preferably polyalkylene polyamines, having about 2 to 60, preferably 2 to 40 (e.g. 3 to 20), total carbon atoms and about 1 to 12, preferably 3 to 12, and most preferably 3 to 9 nitrogen atoms in the molecule. These amines may be hydrocarbyl amines or may be hydrocarbyl amines including other groups, e.g. hydroxy groups, alkoxy groups, amide groups, nitrile groups, or imidazoline groups. Hydroxyl amines with 1 to 6 hydroxy groups, preferably 1 to 3 hydroxy groups, are particularly useful. Preferred amines am aliphatic saturated amines, including those of the general formulas:

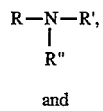

and

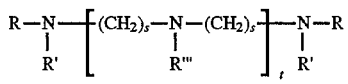

wherein R, R', R" and R'" are independently selected from the group consisting of hydrogen; $C_1$ to $C_{25}$ straight or branched chain alkyl radicals; $C_1$ to $C_{12}$ alkoxy $C_2$ to $C_6$ alkylene radicals; $C_2$ to $C_{12}$ hydroxy amino alkylene radicals; and $C_1$ to $C_{12}$ alkylamino $C_2$ to $C_6$ alkylene radicals; and wherein R'" can additionally comprise a moiety of the formula:

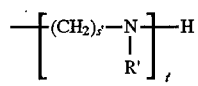

wherein R' is as defined above, and wherein s and s' can be the same or a different number of from 2 to 6, preferably 2 to 4; and t and t' can be the same or different and are numbers of from 0 to 10, preferably 2 to 7, and most preferably about 3 to 7, with the proviso that the sum of t and t' is not greater than 15. To facilitate reaction, it is preferred that R, R', R", R'", s, s', t and t' be selected in a manner sufficient to provide the compounds of formulas I and II with typically at least one primary or secondary amine group, preferably at least two primary or secondary amine groups. This can be achieved by selecting at least one of said R, R', R" or R'" groups to be hydrogen or by letting t in formula II be at least one when R'" is H or when the moiety of formula III possesses a secondary amino group. The most preferred amine of the above formulas are represented by formula II and contain at least two primary amine groups and at least one, and preferably at least three, secondary amine groups.

Non-limiting examples of suitable amine compounds include: 1,2-diaminoethane; 1,3-diaminopropane; 1,4-diaminobutane; 1,6-diaminohexane; poly ethylene amines for example diethylene triamine, triethylene tetramine, and tetraethylene pentamine; polypropylene amines, for example, 1,2-propylene diamine, di-(1,2-propylene)-triamine, and di-(1,3-propylene) triamine; N,N-dimethyl-1,3-diaminopropane; N,N- di-(2-aminoethyl) ethylene diamine; N,N-di(2-hydroxyethyl)-1,3-propylene diamine; 3-dodecyloxypropylamine; N-dodecyl- 1,3-propane diamine; trishydroxymethylaminomethane (THAM); diisopropanol amine; diethanol amine; triethanol amine; mono-, di-, and tri-tallow amines; amino morpholines, for example N-(3-aminopropyl) morpholine; and mixtures thereof.

Other useful amine compounds include: alicyclic diamines, for example 1,4-di(aminomethyl) cyclohexane, and heterocyclic nitrogen compounds, for example imidazolines, and N-aminoalkyl piperazines of the general formula

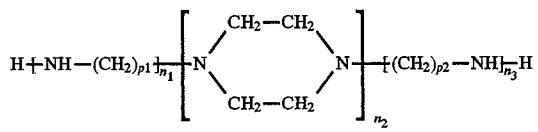

wherein $p1$ and $p2$ are the same or different and are each integers of from 1 to 4, and $n_1$, $n_2$ and $n_3$ are the same or different and are each integers of from 1 to 3. Non-limiting examples of such amines include 2-pentadecyl imidazoline and N-(2-aminoethyl) piperazine. Commercial mixtures of amine compounds may advantageously be used. For example, one process for preparing alkylene amines involves the reaction of an alkylene dihalide (for example, ethylene dichloride or propylene dichloride) with ammonia, which results in a complex mixture of alkylene amines wherein pairs of nitrogens are joined by alkylene groups, forming such compounds as diethylene triamine, triethylene tetramine, tetraethylene pentamine and isomeric piperazines. Low cost poly(ethyleneamine) compounds averaging about 5 to 7 nitrogen atoms per molecule are available commercially, for example under the trade names "Polyamine H", "Polyamine 400", and "Dow Polyamine E-300".

Useful amines also include polyoxyalkylene polyamines, for example those of the formulas:

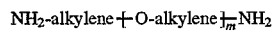

where m has a value of about 3 to 70 and preferably 10 to 35; and

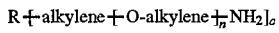

where n has a value of about 1 to 40 with the provision that the sum of all the n's is from about 3 to about 70 and preferably from about 6 to about 35, and R is a polyvalent saturated hydrocarbon radical of up to ten carbon atoms wherein the number of substituents on the R group is represented by the value of a, which is a number of from 3 to 6. The alkylene groups in either formula V or VI may be straight or branched chains containing about 2 to 7, and preferably about 2 to 4 carbon atoms.

The polyoxyalkylene polyamines of formulas V or VI above, preferably polyoxyalkylene diamines and polyoxyalkylene triamines, may have average molecular weights ranging from about 200 to about 4000, and preferably from about 400 to about 2000. The preferred polyoxyalkylene polyamines include the polyoxyethylene and polyoxypropylene diamines and the polyoxypropylene triamines having average molecular weights ranging from about 200 to 2000. The polyoxyalkylene polyamines are commercially available and may be obtained, for example, from the Jefferson Chemical Company, Inc. under the trade name "Jeffamines D-230, D-400, D-1000, D- 2000, T-403", etc.

The amine is readily reacted with the selected hydrocarbyl-substituted carboxylic acid material, e.g. alkenyl succinic anhydride, by heating an oil solution containing 5 to 95 wt. % of said hydrocarbyl-substituted carboxylic acid material to about 100° to 250° C., preferably 125° to 175° C., generally for 1 to 10, e.g. 2 to 6 hours until the desired amount of water is removed. The heating is preferably carried out to favour formation of imides or mixtures of imides and amides, rather than amides and salts. Reaction ratios of hydrocarbyl-substituted carboxylic add material to equivalents of amine as well as the other nucleophilic reactants described herein can vary considerably, depending on the reactants and type of bonds formed. Generally from 0.1 to 1.0, preferably from about 0.2 to 0.6, e.g. 0.4 to 0.6, equivalents of carboxylic acid unit content (e.g. substituted succinic anhydride content) is used per reactive equivalent of nucleophilic reactant, e.g. amine. For example, about 0.8 mole of a pentamine (having two primary amino groups and five reactive equivalents of nitrogen per molecule) is preferably used to convert into a mixture of amides and imides, a composition, having a functionality of 1.6, derived from reaction of a polyolefin and maleic anhydride; i.e. preferably the pentamine is used in an amount sufficient to provide about 0.4 equivalents (that is, 1.6 divided by (0.8×5) equivalents) of succinic anhydride units per reactive nitrogen equivalent of the amine.

The ashless dispersant esters are derived from reaction of the aforesaid long chain hydrocarbyl-substituted carboxylic acid material and hydroxy compounds, for example, monohydric or polyhydric alcohols or aromatic compounds, for example phenols and naphthols. The polyhydric alcohols are the most preferred hydroxy compounds and preferably contain from 2 to about 10 hydroxy radicals, for example, ethylene glycol, diethylene glycol, triethylene glycol, tetraethylene glycol, dipropylene glycol, and other alkylene glycols in which the alkylene radical contains from 2 to about 8 carbon atoms. Other useful polyhydric alcohols include glycerol, monooleate of glycerol, monostearate of glycerol, monomethyl ether of glycerol, pentaerythritol, dipentaerythritol, and mixtures thereof.

The ester dispersants may also be derived from unsaturated alcohols, for example, allyl alcohol, cinnamyl alcohol, propargyl alcohol, 1-cyclohexane-3-ol, or oleyl alcohol. Still other classes of the alcohols capable of yielding ester dispersants comprise the ether alcohols and amino alcohols including, for example, oxyalkylene-, oxy-arylene-, aminoalkylene-, and aminoarylene-substituted alcohols having one or more oxyalkylene, oxyarylene, aminoalkylene or aminoarylene radicals. They are exemplified by Cellosolve, Carbitol, N,N,N',N'-tetrahydroxy-trimethylene diamine, and ether alcohols having up to about 150 oxyalkylene radicals in which the alkylene radical contains from 1 to about 8 carbon atoms.

The ester dispersants may be diesters fully esterified acids or acidic esters, i.e. partially esterified acids or partially esterified polyhydric alcohols or phenols, i.e. esters having free alcohols or phenolic hydroxyl radicals. Mixtures of the above- illustrated esters likewise are contemplated within the scope of this invention.

The ester dispersant may be prepared by one of several known methods as illustrated for example in U.S. Pat. Nos. 3,381,022 and 3,836,471.

Hydroxy amines which can be reacted with the aforesaid long chain hydrocarbyl-substituted carboxylic add materials to form dispersants include 2-amino- 1-butanol, 2-amino-2-methyl -1-propanol, p-(beta-hydroxyethyl)-aniline, 2-amino- 1-propanol, 3-amino- 1-propanol, 2-amino-2-methyl -1,3-propanediol, 2-amino-2-ethyl-1,3-propanediol, N-(beta-hydroxy-propyl)-N'-(beta-aminoethyl)piperazine, tris(hydroxymethyl) aminomethane (also known as trismethylolaminomethane), 2-amino-1-butanol, ethanolamine, and beta-(betahydroxyethoxy)ethylamine. Mixtures of these or similar amines can also be employed. The above description of nucleophilic reactants suitable for reaction with the hydrocarbyl-substituted carboxylic acid material includes amines, alcohols, and compounds of mixed amine and hydroxy containing reactive functional groups, i.e. amino-alcohols.

A preferred group of ashless dispersants are those derived from polyisobutylene substituted with succinic anhydride groups and reacted with one or more compounds selected from polyethylene amines, e.g. tetraethylene pentamine and pentaethylene hexamine, polyoxyethylene and polyoxypropylene amines, e.g. polyoxypropylene diamine trismethylolaminomethane, and the above-described alcohols, for example, pentaerythritol. One class of particularly preferred dispersants includes those derived from polyisobutene substituted with succinic anhydride groups and reacted with (i) a hydroxy compound, e.g. pentaerythritol, (ii) a polyoxyalkylene polyamine, e.g. polyoxypropylene diamine, and/or (iii) a polyalkylene polyamine, e.g. polyethylene diamine or tetraethylene pentamine. Another preferred dispersant class includes those derived from polyisobutenyl succinic anhydride reacted with (i) a polyalkylene polyamine, e.g. tetraethylene pentamine, and/ or (ii) a polyhydric alcohol or polyhydroxysubstituted aliphatic primary amine, e.g. pentaerythritol or trismethylolaminomethane.

2. Long chain aliphatic compounds, especially hydrocarbons having amine groups attached directly thereto, for example, reaction products of a relatively high molecular weight aliphatic or alicyclic halide, for example, a polyisobutenyl halide, with an amine, preferably a polyalkylene polyamine. These may be characterized as "amine dispersants" and examples thereof are described for example, in U.S. Pat. Nos. 3,275,554, 3,454,555 and 3,565,804.

3. Reaction products of alkyl phenols in which the alkyl group contains at least about 30 carbon atoms with aldehydes (especially formaldehyde) and amines (especially polyalkylene polyamines), which may be characterized as "Mannich dispersants." The materials described in the following U.S. Patents are illustrative of Mannich dispersants:

U.S. Pat. No. 3,725,277

U.S. Pat. No. 3,725,480

U.S. Pat. No. 3,726,882

U.S. Pat. No. 3,980,569.

Examples of suitable Mannich dispersants are condensation products formed by condensing about 1 molar proportion of a long chain-substituted phenol with about 1 to 2.5 moles of formaldehyde and about 0.5 to 2 moles of a polyalkylene polyamine (see, for example, U.S. Pat. No. 3 442 808). In the amine and Mannich dispersants, long chain hydrocarbon groups are suitably derived from polymers of a $C_2$ to $C_5$ monoolefin, the polymers having a number average molecular weight of about 700 to about 5000.

4. Products obtained by post-treating the carboxylic, amine or Mannich dispersants with, for example, such reagents as urea, thiourea, carbon disulphide, phosphosulphurized hydrocarbons, aldehydes, ketones, carboxylic acids, hydrocarbon-substituted succinic anhydrides, nitriles, epoxides, boron compounds or phosphorus compounds. Examples of materials of this type are given in the following U.S. Patents:

U.S. Pat. No. 2,805,217

U.S. Pat. No. 3,087,936

U.S. Pat. No. 3,254,025

U.S. Pat. No. 3,394,179

U.S. Pat. No. 3,511,780

U.S. Pat. No. 3,703,536

U.S. Pat. No. 3,704,308

U.S. Pat. No. 3,708,422

U.S. Pat. No. 3,850,822

U.S. Pat. No. 4,113,639

U.S. Pat. No. 4,116,876.

Nitrogen- and ester-containing dispersants are preferably further treated by boration as generally taught in U.S. Pat. Nos. 3,087,936 and 3,254,025 (incorporated herein by reference). This may readily be accomplished by treating the selected nitrogen dispersant with a boron compound selected from the class consisting of boron oxide, boron halides, boron acids and esters of boron adds in an amount to provide from about 0.1 atomic proportion of boron for each mole of said nitrogen dispersant to about 20 atomic proportions of boron for each atomic proportion of nitrogen of said nitrogen dispersant. Usefully borated dispersants typically contain from about 0.05 to 2.0 wt. %, e.g. 0.05 to 0.7 wt. % boron based on the total weight of said borated nitrogen dispersant. The boron, which appears to be in the product as dehydrated boric acid polymers (primarily $(HBO_2)_3$), is believed to attach to the dispersant imides and diimides as amine salts, e.g. the metaborate salt of said diimide.

Treating is readily carried out by adding from about 0.05 to 4, e.g. 1 to 3 wt. % (based on the weight of said nitrogen dispersant) of said boron compound, preferably boric acid which is most usually added as a slurry to said nitrogen dispersant and heating with stirring, followed by nitrogen stripping at said temperature ranges. Alternatively, the boron treatment can be carried out by adding boric acid to the hot reaction mixture of the carboxylic acid material and amine while removing water.

5. Interpolymers of oil-solubilizing monomers, for example, decyl methacrylate, vinyl decyl ether and high molecular weight olefins with monomers containing polar substituents, e.g. aminoalkyl acrylates or acrylamides and poly-(oxyethylene)-substituted acrylates. These may be characterized as "polymeric dispersants" and examples thereof are disclosed in the following U.S. Patents:

U.S. Pat. No. 3,329,658
U.S. Pat. No. 3,519,565
U.S. Pat. No. 3,666,730
U.S. Pat. No. 3,702,300.

All of the above-noted patent are incorporated by reference herein for their disclosures of ashless dispersants.

As indicated above, a viscosity index modifier dispersant functions both as a viscosity index modifier and as a dispersant. Examples of viscosity index modifier dispersants suitable for use in accordance with the invention include reaction products of amines, for example polyamines, with a hydrocarbyl-substituted mono -or dicarboxylic acid in which the hydrocarbyl substituent comprises a chain of sufficient length to impart viscosity index modifying properties to the compounds. In general, the viscosity index modifying-dispersant include, for example, (a) a polymer of a $C_4$ to $C_{24}$ unsaturated ester of vinyl alcohol or a $C_3$ to $C_{10}$ unsaturated mono- or di-carboxylic acid with an unsaturated nitrogen-containing monomer having 4 to 20 carbon atoms; (b) a polymer of a $C_2$ to $C_{20}$ olefin with an unsaturated $C_3$ to $C_{10}$ mono- or di-carboxylic acid neutralised with an amine, hydroxyamine or an alcohol; or (c) a polymer of ethylene with a $C_3$ to $C_{20}$ olefin further reacted either by grafting a $C_4$ to $C_{20}$ unsaturated nitrogen-containing monomer thereon or by grafting an unsaturated acid onto the polymer backbone and then reacting carboxylic acid groups of the grafted acid with an amine, hydroxy amine or alcohol.

In these polymers the amine, hydroxy amine or alcohol "mono-or poly-hydric" may be as described above in relation to the ashless dispersants compounds.

It is preferred that the viscosity index modifier dispersant have a number average molecular weight range as determined by vapour phase osmometry, membrane osmometry, or gel permeation chromatography, of 1,000 to 2,000,000; preferably 5,000 to 250,000 and most preferably 10,000 to 200,000. It is also preferred that the polymers of group (a) comprise a major weight amount of unsaturated ester and a minor, e.g. 0.1 to 40, preferably 1 to 20, wt. % of a nitrogen-containing unsaturated monomer, based on the weight of the total polymer. Preferably the polymer group (b) comprises 0.1 to 10 moles of olefin moieties, preferably 0.2 to 5 moles $C_2$–$C_{20}$ aliphatic or aromatic olefin moieties, per mole of unsaturated carboxylic acid moiety and that from 50 percent to 100 percent, of the acid moieties are neutralized. Preferably the polymer of group (c) comprises an ethylene interpolymer of 25 to 80 wt. % ethylene with 75 to 20 wt. % $C_3$ to $C_{20}$ mono and/or diolefin, 100 parts by weight of ethylene copolymer being grafted with either 0.1 to 40, preferably 1 to 20, pans by weight unsaturated nitrogen-containing monomer, or being grafted with 0.01 to 5 parts by weight of unsaturated $C_3$ to $C_{10}$ mono or dicarboxylic acid, which acid is 50 percent or more neutralized.

The unsaturated carboxylic acids used in (a), (b) and (c) above will preferably contain 3 to 10, more usually 3 to 4, carbon atoms and may be monocarboxylic, for example, methacrylic and acrylic acids or dicarboxylic, for example, maleic acid, maleic anhydride and fumaric add.

Examples of unsaturated esters that may be used include esters of aliphatic saturated mono alcohols having at least 1 carbon atom, and preferably of from 12 to 20 carbon atoms, for example, decyl acrylate, lauryl acrylate, stearyl acrylate, eicosanyl acrylate, docosanyl acrylate, decyl methacrylate, diamyl fumarate, lauryl methacrylate, cetyl methacrylate, and stearyl methacrylate, and mixtures thereof.

Other esters include the vinyl alcohol esters of $C_2$ to $C_{22}$ fatty or mono carboxylic acids, preferably saturated, for example vinyl acetate, vinyl laurate, vinyl palmitate, vinyl stearate, and vinyl oleate, and mixtures thereof.

Examples of suitable unsaturated nitrogen-containing monomers containing 4 to 20 carbon atoms which can be used in (a) and (c) above include the amino-substituted olefins, for example, p-(beta-diethylaminoethyl)styrene; basic nitrogen-containing heterocycles carrying a polymerizable ethylenically unsaturated substituent, e.g. the vinyl pyridines and the vinyl alkyl pyridines for example, 2-vinyl-5-ethyl pyridine, 2-methyl-5-vinyl pyridine, 2-vinyl-pyridine, 3-vinyl-pyridine, 4-vinyl-pyridine, 3-methyl-5-vinyl-pyridine, 4-methyl-2-vinyl-pyridine, 4-ethyl-2-vinyl-pyridine and 2-butyl-5-vinyl-pyridine.

N-vinyl lactams are also suitable, particularly when they are N-vinyl pyrrolidones or N-vinyl piperidones. The vinyl radical is preferably unsubstituted ($CH_2$=CH—), but it may be mono-substituted with an aliphatic hydrocarbon group having 1 to 2 carbon atoms, such as a methyl or ethyl group.

The vinyl pyrrolidones are in the preferred class of N-vinyl lactams and are exemplified by N-vinyl pyrrolidone, N-(1-methylvinyl-pyrrolidone, N-vinyl-5-methyl pyrrolidone, N-vinyl-3,3-dimethyl pyrrolidone, N-vinyl-5-ethyl pyrrolidone, N-vinyl-4-butyl pyrrolidone, N-ethyl-3-vinyl pyrrolidone, N-butyl-5-vinyl pyrrolidone, 3-vinyl pyrrolidone, 4-vinyl pyrrolidone, 5-vinyl pyrrolidone and 5-cyclohexyl-N-vinyl pyrrolidone.

Examples of olefins which could -be used to prepare the interpolymers of (b) and (c) above include mono-olefins for example propylene, 1-butene, 1-pentene, 1-hexene, 1-heptene, 1-decene, 1-dodecene, and styrene.

Representative non-limiting examples of diolefins that can be used in (c) include 1,4-hexadiene, 1,5-heptadiene, 1,6-octadiene, 5-methyl-1,4-hexadiene, 1,4-cyclohexadiene, 1,5-cyclo-octadiene, vinyl-cyclohexane, dicyclopentenyl and 4,4'-dicyclohexenyl for example tetrahydroindene, methyl tetrahydroindene, dicyclopentadiene, bicyclo(2,2,1) hepta-2,5-diene, alkenyl, alkylidiene, 5-methylene-2-norbornene, and 5-ethylidene-2-norbornene.

Typical polymeric viscosity index modifier dispersants include interpolymers of alkyl methacrylates with N-vinyl pyrrolidone or dimethylaminoalkyl methacrylate, alkyl fumarate/vinyl acetate/N-vinyl pyrrolidine interpolymers, post-grafted interpolymers of ethylene-propylene with an active monomer, for example maleic anhydride, which may be further reacted with an alcohol or an alkylene polyamine, e.g. see U.S. Pat. 0Nos. 4,089,794, 4,160,739, 4,137,185; or interpolymers of ethylene and propylene reacted or grafted with nitrogen compounds for example shown in U.S. Pat. Nos. 4,068,056, 4,068,058, 4,146,489, 4,149,984; styrene/ maleic anhydride polymers post-reacted with alcohols and amines, ethoxylated derivatives of acrylate polymers, for example, see U.S. Pat. No. 3,702,300.

Other examples of viscosity index modifier dispersants are given later in this specification.

Examples of dispersants and viscosity index modifier dispersants may be found in European Patent No. 24 146B, the disclosure of which is incorporated herein by reference.

The invention may find use in any process for the manufacture of a functionalised polymer, particularly an ashless dispersant or a viscosity index modifier dispersant, involving a chemical reaction between reactants which are to some extent mutually insoluble, that is reactants in different phases.

In some cases, the invention may enable one or more steps in a process for the manufacture of a functionalised polymer, particularly an ashless dispersant or a viscosity index modifier dispersant to be carded out continuously. Advantageously, at least one step, and preferably each step, in such a process is carried out continuously.

In one embodiment of the invention, each of the first and second reactants, independently, is present in the reaction mixture as a liquid or solid. In this case, a third, gaseous reactant may optionally also be present.

As indicated above, one widely used class of ashless dispersants comprises the hydrocarbyl-substituted dicarboxylic acids or anhydrides, especially succinic add or anhydride having a side chain derived from polyisobutylene, the last-mentioned compounds commonly being known as PIBSAs, and their reaction products with alcohols and/or amines, for example, polyamines (PAMs). In the following discussion, the invention is illustrated with reference to the preparation and use of PIBSAs and their derivatives, but it is to be understood that the invention is also applicable to the preparation of other dispersants/dispersant intermediates, including viscosity index modifier dispersants (multifunctional viscosity modifiers).

One process for the manufacture of PIBSAs involves a chlorination step, in which a polyisobutylene (PIB) is reacted with chlorine, and an "acidification" step, in which the chlorinated PIB is reacted with maleic anhydride. The PIBSA may then be reacted with an alcohol or amine (e.g. a polyamine mixture) in an esterification or amination step to produce an esterified or aminated dispersant, which may then, if desired, be post-treated for example, borated (particularly if the dispersant is to be used in a lubricating oil).

At least three of the four steps indicated above involve the use of reactants which are to some extent mutually insoluble, that is, reactants in different phases. Thus, the chlorination step involves the reaction of a liquid and a gas which is at least partially insoluble in the liquid, the acidification step involves the reaction of at least partially immiscible liquids, and the boration step involves the reaction of a liquid and a solid which is at least partially insoluble in the liquid. The applicants have surprisingly found that very significant improvements in this long-established preparative method can be obtained if the reactants in at least one of these three steps, preferably in each of the steps, are reacted in accordance with the invention. Improvements may also be obtained in the amination step if this step involves the use of immiscible or partially immiscible reactants.

In some cases, it is possible to prepare a PIBSA from a PIB by a thermal reaction, without the use of a chlorination step. A PIBSA prepared without a chlorination step, or a derivative of such a PIBSA, may of course be further reacted using a process in accordance with the invention.

Where the chlorination step is carded out in accordance with the invention, this step may be carried out, for example, at ambient pressures (if desired) at a temperature in, for example, the range of from 40° to 150° C., the temperature used in any particular case depending on the nature of the reactants. The reactants are preferably fed separately to the reaction region, chlorine being charged in the stoichiometric amount (1 mole of $Cl_2$ for each mole of olefin), or, for example, in a 10 to 50% excess, the proportion of chlorine used depending on the degree of chlorination required. The process may be carded out continuously, and is particularly suitable for use with linear or branched liquid olefins or polyolefins having a number average molecular weight in the range of from about 70 (C5) to about 10000 (approximately C700) and having reactive hydrogen atoms. In certain cases, it may be desirable to carry out the chlorination step under reduced pressure to facilitate the removal of gaseous by-products.

Where the acidification step is carried out in accordance with the invention, this step may suitably be carded out at a pressure of from 0 to 3.5 bar ($3.5 \times 10^5$ Pa) and at a temperature in the range of from 100° to 280° C., the conditions used in any particular case being chosen having regard to the reactants employed. The acidic compound (maleic anhydride in the process illustrated above) may be charged in the stoichiometric amount (1 mole of acid for each mole of PIB) or in an excess (for example, in a 10 to 100 mass % excess). Preferably, the product contains from 0.5 to 2, preferably 0.8 to 1.7, more preferably 1.0 to 1.5, for example, 1.05 to 1.2, acid groups, for example succinic groups, per mole of polyolefin starting material employed. The process may, if desired, be carded out continuously.

The process is particularly suitable for use with derivatives of linear or branched olefins or polyolefins having a number average molecular weight in the range of from about 70 (C5) to about 10000 (approximately C700) with dienophiles which include, for example, maleic anhydride, maleic acid, fumaric acid, acrolein, crotonaldehyde, acrylic acid/ester methacrylic add/ester, and other substances capable of undergoing a Diels Alder reaction with the chlorinated olefin.

The products of the acidification step may be used as fuel/lubricant additives, or may be used as intermediates in the preparation of other additives.

Where the amination and/or boration steps is/are carried out in accordance with the invention, a temperature of from 50° to 200° C. may, for example, be used, the temperature used in any particular case depending on the nature of the feedstock employed. The processes may, if desired, be carded out continuously.

The processes are particularly suitable for use with alkenyl succinic anhydrides derived from linear or branched liquid olefins or polyolefins with number average molecular weights ranging from 70 (C5) to 10000 (approximately C700) and linear or branched polyamines having, for example, 2 to 10 nitrogen atoms and at least two primary nitrogen atoms, for example, triethylene tetramine, tetraethylene pentamine, pentaethylene hexamine, and their branched isomers, alcohols, for example, pentaerythritol, and amino-alcohols, for example, tris(hydroxyamino) methane. Aminated and esterified dispersants may be used in lubricating oils or in fuels. In fuels they may act as combustion improvers.

The aminated dispersant may be post-treated, e.g. by being borated with, for example, $H_3BO_3$ slurried in oil or as a powder. The borated dispersants may be used in lubricating oils.

In carrying out reactions in accordance with the invention, particularly advantageous results may be obtained if the mass ratio of the reactants is kept substantially constant during the reaction. The optimum ratio for any given apparatus and reaction can be ascertained by routine experiment. For guidance, particularly advantageous mass ratios of reactants for the specific processes referred to above carried out in one type of laboratory-scale reactor are indicated in Table 1, where $$\% \text{ heterogeneous phase} = \frac{\text{mass of reactant used in the smaller proportion}}{\text{mass of reactant used in the larger proportion}} \times 100$$

For the specific processes referred to above and in Table 1, where one of the reactants is present in the solid or gaseous phase, that reactant is the reactant used in the smaller proportion. In the above-mentioned acidification step in dispersant production, where both reactants are present in the liquid phase, the maleic anhydride is the reactant used in the smaller proportion.

TABLE 1

| Reaction | % heterogeneous phase | |
| --- | --- | --- |
| | Broad | Preferred |
| Chlorination | 1–20 | 5–10 |
| Acidification | 1–25 | 5–15 |
| Boration | 0.5–10 | 1–5 |

The mass of the liquid phase reactant may in some cases include the mass of a solvent or diluent.

Where appropriate, the product of any of the steps mentioned above may be used as such, for example, as a lubricating or fuel oil additive. Alternatively, such a product may be used as an intermediate in the preparation of a substance suitable for use as a lubricating or fuel oil additive, or for use as an intermediate in the preparation of such an additive.

Manufacture of a functionalised polymer by a process according to the invention may lead to more uniform functionalisation (more polymer molecules with the same number of functional groups) and/or less unreacted polymer. Further, the process of the invention may make possible savings in equipment and/or manpower. Accordingly, the invention also provides the use of apparatus comprising a reaction region defined by a surface and at least one member adjacent to the surface, and means for causing relative movement between the surface and the member(s), for improving uniformity of functionalisation and/or reducing the proportion of unreacted polymeric compound in a process for the manufacture of a functionalised polymer and the use of apparatus comprising means for causing reactants to move in a thin film over a surface, for improving uniformity of functionalisation and/or reducing the proportion of unreacted polymeric compound in a process for the manufacture of a functionalised polymer.

Improvements that may be obtained by the production of a dispersant/viscosity index modifier dispersant or intermediate by a process in accordance with the invention may include one or more of improved properties and consistency of quality of the dispersants/viscosity index modifier dispersants or intermediates lower production of chlorinated hydrocarbons as by-products, a lower level of organic contaminants in the hydrogen chloride produced as a by-product in the acidification step, improved yields and rate of production of the product, the possibility in some cases of carrying out one or more of the steps continuously, and a reduction in amounts of sediment obtained at the end of the process, with a consequent reduction in amounts of unwanted material to be removed, for example, by filtration, and to be disposed of. Indeed, in some cases it may be possible completely to eliminate the need for a final filtration step. In certain cases, the use of a semicontinuous procedure, where one or more reactants are added while a reaction is already taking place, may be advantageous.

Examples of advantageous results which have been observed in laboratory preparations of PIBSA-PAM dispersants by a process in accordance with the invention carried out in a reactor of the type used in the Examples herein include an increase in yield, a 150 to 200-fold increase in productivity during chlorination and a 50 to 70-fold increase in rate of production during acidification, results obtained in accordance with the invention being compared in each case with results obtained when carrying out the same process in a conventional stirred reactor.

In accordance with one aspect of the invention, reactants in different phases are reacted in a region defined by a surface and at least one member adjacent to the surface, there being relative movement between the surface and the member(s) such that the reactants are caused to move relative to the surface. Advantageously, the region is defined by adjacent surfaces between which there is relative movement such that the reactants are caused to move relative to one or both of the surfaces.

Because the surface and the member(s) (or, in the preferred case, the two surfaces) defining the reaction region are adjacent to each other, the reactants are reacted in a thin film and are caused to move relative to the surface or, if there are two surfaces, to least one of the surfaces. The very high mechanical forces exerted on the reactants as a result of the arrangement and action of the surface/member(s) and the surfaces result in significant improvements as described elsewhere in this specification.

In a further aspect of the invention, the reactants are caused to move in a thin film on a surface over which they move, the average velocity (taken across the thickness of the film) of a mixture of the reactants in a direction parallel to the surface being at least 1 m/sec, the thin film advantageously being formed between the surface and at least one member adjacent to the surface, preferably between adjacent surfaces, there being relative movement between the surface and the member(s), or between the surfaces, causing the said movement of the reactants.

A thin film in accordance with the invention advantageously has a thickness of at most 25 mm, preferably at most 20 mm, and especially at most 15 mm. In particular applications, film thicknesses in the range of from 0.1 to 10 mm, especially 0.2 to 10 mm, have been found to be especially advantageous.

Although the invention extends to arrangements where this is not the case, the film thickness is advantageously determined by the width of the gap between the surface and at least one member adjacent to the surface (and preferably, between adjacent surfaces), and the said gap advantageously has a width of at most 25 mm, preferably at most 20 mm, and especially at most 15 mm. (In accordance with the invention, therefore, the surface and the member, or two surfaces, are said to be "adjacent" if they define a reaction region which advantageously has a thickness of at most 25 min.) In particular forms of apparatus suitable for use in accordance with the invention, gaps with a width in the range of from 0.1 to 10 mm, especially 0.2 to 10 mm, have been found to be particularly advantageous. The width of the gap need not be constant throughout the reaction region.

Where there is a thin film of material between a surface and at least one member adjacent to the surface (preferably between adjacent surfaces), relative movement of the surface and the member(s) or between the surfaces causes movement of the mixture of reactants relative to a surface. In the preferred case, discussed in more detail below, where the surface, or one of the surfaces, is stationary and the member(s) or the other surface moves, the mixture will tend to move in a direction parallel to the stationary surface with an average velocity less than, but for a thin film approaching, that of the adjacent moving member/surface.

Thus, for example, where the reactants are reacted in a thin film formed between an inner rotor and an outer stator, the mixture of reactants will tend to move over the surface of the stator with an average velocity less than, but approaching, the peripheral velocity of the rotor. In accordance with the invention, the mixture advantageously moves with an average velocity (taken across the thickness of the film) of at least 1 m/sec, advantageously at least 5 m/sec, and preferably a least 10 m/sec, and these are preferred peripheral velocities for the rotor in arrangements where the reactants are reacted in a region defined by an inner body and an adjacent outer housing, one of which, preferably the inner body, forms a rotor and the other of which forms a stator. In one particularly preferred arrangement having a central rotor and an outer starer, a peripheral speed of the rotor in the range of from 20 to 30 m/sec was found to be especially advantageous.

In an embodiment not at present preferred, both the surface and the member(s), or both the surfaces, move. If the surface and member(s), or the two surfaces, move in opposite directions (for example, if an inner body and an adjacent outing housing are rotated in opposite directions),the minimum average velocity of 1 m/sec mentioned above is the velocity relative to the surface or one of the surfaces.

It will be appreciated that the movement of the mixture of reactants will normally have components in more than one direction. Thus, for example, in an arrangement where the reactants are reacted in a region defined by an inner body and an adjacent outer housing, one of which rotates, the movement of the mixture will normally have components in the axial and radial directions as well as in the tangential direction. In such an arrangement, the minimum average velocity of 1 m/sec referred to herein is the component of velocity in the tangential direction. As indicated above, where the inner body and outer housing are adjacent to each other so that there is a thin film of material between them, the mixture of reactants has an average velocity (taken across the thickness of the film) having a component in the tangential direction approaching the peripheral speed of the rotor.

When the reaction region is defined by a surface and at least one member adjacent to the surface (and, preferably, by two adjacent surfaces), the surface and/or the member(s) (or one or both of the surfaces) may be caused to move, although it is normally preferred that the surface remains stationary. Any type of movement may be employed. Thus, for example, the movement may be an oscillatory movement. Advantageously, however, the member(s) or, where there are two surfaces, one of the surfaces rotates, the other surface remaining stationary.

Where the reaction region is defined by a surface and at least one member adjacent to the surface, or each member may comprise, for example, a blade extending radially outwardly from a shaft which, in use, is rotated at high speed. Such rotation will cause the reactants to form a thin film on the surface and to move over the surface. There may also be at least one zone where centrifugal forces cause the reactants to travel in a generally radial direction at a considerable velocity before meeting the surface. In some cases, centrifugal forces may be sufficient to maintain on the surface a thin film whose thickness is less than the width of the gap between the surface and the outer extremities of the blades.

In the preferred case, where reaction of the reactants takes place in a region defined by two surfaces, the reaction region may, if desired, be defined by opposing surfaces of two plates, for example, discs, although this arrangement is not at present preferred. Preferably one of the plates is rotated at high speed, for example, from 500 to 10,000 rpm, depending on the diameter, while the other plate is stationary. The opposing surfaces of the plates are relatively close to each other (that is, adjacent to each other) so that only a thin film of material to be reacted is present between them at any one time, the gap between the plates preferably being, for example, of the order of 0.2 to 25 mm. The plates may be, for example, discs having a diameter of up to 50 cm, although larger diameters are not excluded. Where one disc is rotated and the other is stationary, the peripheral velocity of the rotating disc is advantageously at least 1 m/sec, advantageous and preferred velocities being as indicated above in connection with a rotor/stator arrangement.

In a particular preferred embodiment of the invention, the reaction region is a generally annular region defined by a surface of an inner body and a surface of an outer housing, and the material in the region is caused to move by rotation of the inner body and/or the outer housing, advantageously by rotation of the inner body while the housing remains stationary.

References to a "generally annular" region include not only the case where the inner body is in the form of a right circular cylinder and the inner surface of the housing is also smooth, but also the case where one or both of the opposed surfaces defining the mixing region is not smooth. Thus, for example, one or both of the surfaces may have one or more protrusions thereon or one or more depressions therein (including the cases where there is a single helical protuberance and/or a single helical groove) or may be, for example, toothed or corrugated. For example, the outer housing may have a plurality of inwardly-extending protrusions thereon, the protrusions, which are preferably all of the same size and shape as one another, preferably being spaced apart at regular intervals on the inner surface of the outer housing, and the inner body (the rotor in this case) may have a plurality of outwardly extending regularly spaced projections of the same size and shape as one another. Alternatively, or in addition, the inner body or the housing may have one or more apertures or discontinuities (for example, slots) therein.

Although in the preferred arrangements described above, the outer diameter of the inner body (or, where the inner body is not in the form of a right circular cylinder, the diameter of the volume swept out by the inner body if it were to rotate) and the inner diameter of the housing (or the diameter of the volume that would be enclosed in the interior of the housing if it were to rotate) are advantageously constant along the length of the rotor, one or both of the diameters may vary along the length of the gap. Thus, for example, starting from one end of the inner body and housing, the inner diameter of the housing may remain constant or decrease, while the external diameter of the inner body increases, or both said diameters may increase but at different rates, or the external diameter of the inner body may remain constant while the internal diameter of the housing decreases.

In the arrangements discussed above, the inner body may be located coaxially or eccentrically with respect to the housing, but preferably the housing and inner body are radially symmetrical and coaxial.

As indicated earlier, the inner body and/or the outer housing may have one or more apertures or discontinuities therein. Such apertures or discontinuities enable material to pass through the body in question in a generally radial direction, so that, for example, reactants fed to the centre of a hollow rotor can travel radially outwards to react in the gap between the rotor and stator. Further, the stator may also, or alternatively, have apertures and or discontinuities therein. Where the rotor and/or stator has apertures or discontinuities, it may be possible to use more than one rotor and/or more than one stator. Thus, for example, reactants may pass outwardly, in a generally radial direction, through a first stator, a rotor, and a second stator.

Apertures or discontinuities may of course be present in any body providing a surface referred to in this specification. Where such an annular body has a plurality of discontinuities in the form of slots therein, the body can, in the extreme case, be regarded as a plurality of members as discussed elsewhere in this specification.

Where materials pass through a body providing a surface they will in general be subjected to additional forces, for example, shearing forces, which may enhance the results obtainable in accordance with the invention. Shearing forces may be of importance in all aspects of the invention.

An especially advantageous reactor for use in accordance with the invention comprises an outer casing having within it one or more stators, which may be interconnected with each other, and one or more rotors, which may also be interconnected with each other, such that there is at least one reaction region defined by a rotor and an adjacent stator. Advantageously, each stator and each rotor in such a reactor describes at least a part of the curved wall of a right circular cylinder, the rotor(s) and stator(s) being coaxial with each other and, in the preferred case where the casing also has the general form of a right circular cylinder, with the casing.

Where there is more than one stator and/or more than one rotor, there will normally be more than one reaction region according to the invention. In the last-mentioned case, it will normally be desirable for one or more of the stator(s) and rotor(s) to have apertures and/or discontinuities therein so that the reactants can readily pass from one reaction region to another. Thus, for example, a rotor or stator may have a plurality of circular apertures therethrough, or may comprise a circumferentially continuous portion from which a plurality of wall portions extend in a generally axial direction to give a generally cylindrical surface with discontinuities therein.

An advantageous reactor as described above may be provided with one or more inlets and outlets such that reactants can be introduced in an axial direction to the centre of the rotor/stator arrangement and, after passing radially outwards through the rotor/stator arrangement, can be withdrawn from a zone between the said arrangement and the casing, or from a zone, for example, a post-reaction zone, downstream of the said zone. The rotor advantageously acts as a pump to draw reactants fed axially into the reactor to the centre of the rotor/stator arrangement, and also subjects the reactants to centrifugal forces causing them to move radially outwards through the rotor/stator arrangement. A reactor of this type is very suitable for use in carrying out reactions' in a continuous manner. A rotor which causes or assists movement of fluids within the reactor may of course be used in reactors other than the especially advantageous reactor described above.

For any given reaction, the reaction time required to give optimum results will depend, inter alia, on the nature of the reactants and the reaction temperature, and can be ascertained by routine experiment. If the reaction time is too low, yields may be undesirably low, while if the reaction time is too high, unwanted reactions may occur.

Some reaction of the reactants used in accordance with the invention may occur other than in the reaction zone (the region/thin film) used in accordance with the invention. Thus, for example, the reactants may be mixed before being introduced into the said region/thin film, and some reaction may take place at that stage, or in a post-reaction zone (for example, a "soaking" zone) downstream of the reaction zone used in accordance with the invention. Whether or not reaction occurs elsewhere, advantageously a major part of each of the reactants is treated in a reaction zone used in accordance with the invention. Preferably at least 75 mass % of each of the reactants is treated in the said reaction zone, especially at least 85 mass %, and particularly at least 95 mass %. In the most preferred case, substantially all of each of the reactants is treated in the said reaction zone. Thus the arrangements of inlet(s) and outlet(s) in any given reactor, and the internal design of the reactor, are preferably such that, in passing through the reactor, the reactants are constrained to pass through the reaction zone.

The invention further provides the use of apparatus comprising an outer housing and a rotor within the housing, the housing and the rotor having opposed adjacent surfaces defining a reaction region, in the preparation of a functionalised polymer suitable for use as a lubricating or fuel oil additive or as an intermediate suitable for use in preparing such an additive, the peripheral speed of the rotor preferably being at least 1 m/sec. In particular, the apparatus finds use where a first reactant is present in a different phase from a second reactant.

The dispersant/viscosity index modifier dispersant additives prepared in accordance with the invention are oil-soluble or (in common with certain of the other additives referred to below) are dissolvable in oil with the aid of a suitable solvent, or are stably dispersible materials. Oil-soluble, dissolvable, or stably dispersible as that terminology is used herein does not necessarily indicate that the materials are soluble, dissolvable, miscible, or capable of being suspended in oil in all proportions. It does mean, however, that the additives are, for instance, soluble or stably dispersible in oil to an extent sufficient to exert their intended effect in the environment in which the oil is employed. Moreover, the additional incorporation of other additives may also permit incorporation of higher levels of a particular additive, if desired.

Additives prepared in accordance with the present invention can be incorporated into the oil in any convenient way. Thus, they can be added directly to the oil by dispersing or by dissolving them in the oil at the desired level of concentration, typically with the aid of a suitable solvent such, for example, as toluene, cyclohexane, or tetrahydrofuran. Such blending can occur at room temperature or an elevated temperature.

Additives produced in accordance with the present invention may be useful in fuel oils or lubricating oils. The normally liquid fuel oils are generally derived from petroleum sources, for example, normally liquid petroleum distillate fuels, although they may include those produced synthetically by the Fischer-Tropsch and related processes, the processing of organic waste material or the processing of coal, lignite or shale rock. Such fuel compositions have varying boiling ranges, viscosities, cloud and pour points, according to their end use as is well known to those skilled in the art. Among such fuels are those commonly known as diesel fuels, distillate fuels, for example, gasoline, heating oils, residual fuels and bunker fuels, which are collectively referred to herein as fuel oils. The properties of such fuels are well known to those skilled in the art as illustrated, for example, by ASTM Specification D 396-73, available from the American Society for Testing Materials, 1916 Race Street, Philadelphia, Pa. 19103.

Middle distillate fuel oils include distillates boiling from about 120° to 725° F. (about 49° to 385° C.) (e.g. 375° to 725° F. (191° to 385° C.)), including kerosene, diesel fuels, home heating fuel oil, jet fuels, etc., and most preferably whose 20% and 90% distillation points differ by less than 212° F. (100° C.), and/or whose 90% to final boiling point range is between about 20° and 50° F. (about −7° and 10° C.) and/or whose final boiling point is in the range of 600° to 700° F. (about 316° to 371° C.).

Additives prepared in accordance with the invention are particularly useful in lubricating oil compositions which employ a base oil in which the mixtures are dissolved or dispersed. Base oils with which the additives may be used include those suitable for use as crankcase lubricating oils for spark-ignited and compression-ignited internal combustion engines, for example, automobile and truck engines, marine and railroad diesel engines.

Synthetic base oils include alkyl esters of dicarboxylic acids, polyglycols and alcohols; poly-α-olefins, polybutenes, alkyl benzenes, organic esters of phosphoric acids and polysilicone oils.

Natural base oils include mineral lubricating oils which may vary widely as to their crude source, for example, as to whether they are paraffinic, naphthenic, mixed, or paraffinic-naphthenic, as well as to the method used in their production, for example, distillation range, straight run or cracked, hydrofined, solvent extracted and the like.

More specifically, natural lubricating oil base stocks which can be used may be straight mineral lubricating oil or distillates derived from paraffinic, naphthenic, asphaltic, or mixed base crude oils. Alternatively, if desired, various blended oils may be employed as well as residual oils, particularly those from which asphaltic constituents have been removed. The oils may be refined by any suitable method, for example, using acid, alkali, and/or clay or other agents such, for example, as aluminium chloride, or they may be extracted oils produced, for example, by solvent extraction with solvents, for example, phenol, sulphur dioxide, furfural, dichlorodiethyl ether, nitrobenzene, or crotonaldehyde.

The lubricating oil base stock conveniently has a viscosity of about 2.5 to about 12 cSt (about $2.5 \times 10^{-6}$ to about $12 \times 10^{-6}$ m²/s) and preferably about 2.5 to about 9 cSt. (about $2.5 \times 10^{-6}$ to about $9 \times 10^{-6}$ m²/s) at 100° C.

A dispersant or viscosity index modifier dispersant additive prepared in accordance with the present invention may be employed in a lubricating oil composition which comprises lubricating oil, typically in a major proportion, and the additive, typically in a minor proportion, for example, in a proportion as indicated below. Additional additives may be incorporated in the composition to enable it to meet particular requirements. As indicated earlier, examples of additives which may be included in lubricating oil compositions are viscosity index improvers, corrosion inhibitors, oxidation inhibitors, friction modifiers, dispersants, metal-containing detergents, anti-foaming agents, anti-wear agents, pour point depressants, and rust inhibitors.

Viscosity index improvers (or viscosity modifiers) impart high and low temperature operability to a lubricating oil and permit it to remain shear stable at elevated temperatures and also exhibit acceptable viscosity or fluidity at low temperatures. Suitable compounds for use as viscosity modifiers are generally high molecular weight hydrocarbon polymers, including polyesters, and viscosity index improver dispersants, which, as indicated above, function as dispersants as well as viscosity index improvers.

Oil soluble viscosity modifying polymers generally have number average molecular weights of from $10^3$ to $10^6$, preferably $10^4$ to $10^6$, e.g. 20,000 to 250,000, as determined by gel permeation chromatography or membrane osmometry.

Examples of suitable hydrocarbon polymers include homopolymers and copolymers of two or more monomers of $C_2$ to $C_{30}$, e.g. $C_2$ to $C_8$ olefins, including both alpha-olefins and internal olefins, which may be straight or branched, aliphatic, aromatic, alkyl-aromatic, or cycloaliphatic. Frequently they will be of ethylene with $C_3$ to $C_{30}$ olefins, particularly preferred being the copolymers of ethylene and propylene. Other polymers can be used, for example polyisobutylenes, homopolymers and interpolymers of $C_6$ and higher alpha-olefins, atactic polypropylene, hydrogenated polymers and interpolymers of styrene, e.g. with isoprene and/or butadiene.

More specifically, other hydrocarbon polymers suitable as viscosity index modifiers include those which may be described as hydrogenated or partially hydrogenated homopolymers, and random, tapered, star, or block interpolymers (including terpolymers, terpolymers, etc.) of conjugated dienes and/or monovinyl aromatic compounds with, optionally, alpha-olefins or lower alkenes, e.g. $C_3$ to $C_{18}$ alpha-olefins or lower alkenes. The conjugated dienes include isoprene, butadiene, 2,3-dimethylbutadiene, piperylene and/or mixtures thereof, such as isoprene and butadiene. The monovinyl aromatic compounds include vinyl di- or polyaromatic compounds, e.g. vinyl naphthalene, or mixtures of vinyl mono-, di -and/or polyaromatic compounds, but are preferably monovinyl monoaromatic compounds, for example, styrene or alkylated styrenes substituted at the alpha-carbon atoms of the styrene, for example alpha-methylstyrene, or at ring carbons, such as o-, m-, p-methylstyrene, ethylstyrene, propylstyrene, isopropylstyrene, butylstyrene isobutylstyrene, tert-butylstyrene (e.g. p-tert-butylstyrene). Also included are vinylxylenes, methylethylstyrenes and ethylvinylstyrenes. Alpha-olefins and lower alkenes optionally included in these random, tapered and block copolymers preferably include ethylene, propylene, butene, ethylene-propylene copolymers, isobutylene, and polymers and copolymers thereof. As is also known in the art, these random, tapered and block copolymers may include relatively small amounts, that is less than about 5 mole %, of other copolymerizable monomers, for example vinyl pyridines, vinyl lactams, methacrylates, vinyl chloride, vinylidene chloride, vinyl acetate or vinyl stearate.

Specific examples include random polymers of butadiene and/or isoprene and polymers of isoprene and/or butadiene and styrene. Typical block copolymers include polystyrene-polyisoprene, polystyrene-polybutadiene, polystyrene-polyethylene, polystyrene-ethylene propylene copolymer, polyvinyl cyclohexane-hydrogenated polyisoprene, and polyvinyl cyclohexane-hydrogenated polybutadiene. Tapered polymers include those of the foregoing monomers prepared by any suitable method. Star-shaped polymers typically comprise a nucleus and polymeric arms linked to said nucleus, the arms being comprised of homopolymer or interpolymer of said conjugated diene and/or monovinyl aromatic monomers. Typically, at least about 80% of the aliphatic unsaturation and about 20% of the aromatic unsaturation of the star-shaped polymer is reduced by hydrogenation.

Representative examples of patents which disclose such hydrogenated polymers or interpolymers include U.S. Pat. Nos. 3,312,621, 3,318,813, 3,630,905, 3,668,125 3,763,044, 3,795,615, 3,835,053, 3,838,049, 3,965,019, 4,358,565, and 4,557,849, the disclosures of which are herein incorporated by reference.

The polymer may be degraded in molecular weight, for example by mastication, extrusion, oxidation or thermal degradation, and it may be oxidized and contain oxygen. Also included are derivatized polymers, for example post-grafted interpolymers of ethylene-propylene with an active monomer such as maleic anhydride which may be further reacted with an alcohol, or amine, e.g. an alkylene polyamine or hydroxy amine, e.g. see U.S. Pat. Nos. 4,089,794, 4,160,739, 4,137,185, or copolymers of ethylene and propylene reacted or grafted with nitrogen compounds such as shown in U.S. Pat. Nos. 4,068,056 4,068,058, 4,146,489 and 4,149,984.

Suitable hydrocarbon polymers are ethylene interpolymers containing from 15 to 90 wt. % ethylene, preferably 30 to 80 wt. % of ethylene and 10 to 85 wt. %, preferably 20 to 70 wt. % of one or more $C_3$ to $C_{28}$, preferably $C_3$ to $C_{18}$, more preferably $C_3$ to $C_8$, alpha-olefins. While not essential, such interpolymers preferably have a degree of crystallinity of less than 25 wt. %, as determined by X-ray and differential scanning calorimetry. Interpolymers of ethylene and propylene are most preferred. Other alpha-olefins suitable in place of propylene to form the interpolymer, or to be used in combination with ethylene and propylene, to form a terpolymer, tetrapolymer, etc., include 1-butene, 1-pentene, 1-hexene 1-heptene, 1-octene, 1-nonene, 1-decene, etc.; also branched chain alpha-olefins, for example, 4-methyl-1-pentene, 4-methyl-1-hexene, 5-methylpentene-1, 4,4-dimethyl-1-pentene, and 6-methyl-heptene-1, etc., and mixtures thereof.

Terpolymers, terpolymers, etc., of ethylene, said $C_{3-28}$ alpha-olefin, and non-conjugated diolefin or mixtures of such diolefins may also be used. The amount of the non-conjugated diolefin generally ranges from about 0.5 to 20 mole %, preferably from about 1 to about 7 mole %, based on the total amount of ethylene and alpha-olefin present.

Another family of V.I. improvers are polyesters, most preferably polyesters of ethylenically unsaturated $C_3$ to $C_8$ mono- and dicarboxylic acids, for example, methacrylic and acrylic adds, maleic acid, maleic anhydride, or fumaric acid.

Examples of unsaturated esters that may be used include those of aliphatic saturated mono alcohols of at least 1 carbon atom and preferably of from 12 to 20 carbon atoms, for example, decyl acrylate, lauryl methacrylate, cetyl methacrylate, and stearyl methacrylate, and mixtures thereof.

Other esters include the vinyl alcohol esters of $C_2$ to $C_{22}$ fatty or monocarboxylic acids, preferably saturated, for example, vinyl acetate, vinyl laurate, vinyl palmitate, vinyl stearate, vinyl oleate, and the like and mixtures thereof. Interpolymers of vinyl alcohol esters with unsaturated acid esters, for example, the interpolymer of vinyl acetate with dialkyl fumarates, can also be used.

The esters may be copolymerized with still other unsaturated monomers, for example olefins, e.g. 0.2 to 5 moles of $C_2$-$C_{20}$ aliphatic or aromatic olefin per mole of unsaturated ester, or per mole of unsaturated acid or anhydride followed by esterification. For example, interpolymers of styrene and maleic anhydride esterified with alcohols and amines are known, e.g. see U.S. Pat. No. 3,702,300.

Such ester polymers may be grafted with, or the ester copolymerized with, polymerizable unsaturated nitrogen-containing monomers to impart dispersancy to the V.I. modifiers. Examples of suitable unsaturated nitrogen-containing monomers to impart dispersancy include those containing 4 to 20 carbon atoms, for example amino substituted olefins as p-(beta-diethylaminoethyl)styrene; basic nitrogen-containing heterocycles carrying a polymerizable ethylenically unsaturated substituent, e.g. the vinyl pyridines and the vinyl alkyl pyridines, for example 2-vinyl-5-ethyl pyridine, 2-methyl-5-vinyl pyridine, 2-vinyl-pyridine, 3-vinyl-pyridine, 4-vinyl-pyridine, 3-methyl-5-vinyl-pyridine, 4-methyl-2-vinyl-pyridine, 4-ethyl-2-vinyl-pyridine and 2-butyl-5-vinyl-pyridine and the like.

N-vinyl lactams are also suitable, e.g. N-vinyl pyrrolidones or N-vinyl piperidones.

The vinyl pyrrolidones are preferred and are exemplified by N-vinyl pyrrolidone, N-(1-methyl-vinyl) pyrrolidone, N-vinyl-5-methyl pyrrolidone, N-vinyl-3,3-dimethylpyrrolidone, and N-vinyl-5-ethyl pyrrolidone.

Corrosion inhibitors, also known as anti-corrosive agents, reduce the degradation of the metallic parts contacted by the lubricating oil composition. Illustrative of corrosion inhibitors are phospho-sulphurized hydrocarbons and the products obtained by reaction of a phosphosulphurized hydrocarbon with an alkaline earth metal oxide or hydroxide, preferably in the presence of an alkylated phenol or of an alkylphenol thioester, and also preferably in the presence of carbon dioxide. Phosphosulphurized hydrocarbons may be prepared by reacting a suitable hydrocarbon, for example, a terpene, a heavy petroleum fraction of a $C_2$ to $C_6$ olefin polymer such, for example, as polyisobutylene, with from 5 to 30 mass % of a sulphide of phosphorus for ½ to 15 hours, at a temperature in the range of about 65° to about 315° C. Neutralization of the phosphosulphurized hydrocarbon may be effected in any suitable manner, for example, in the manner taught in U.S. Pat. No. 1,969,324.

Oxidation inhibitors, or antioxidants, reduce the tendency of mineral oils to deteriorate in service, evidence of such deterioration being, for example, the production of varnish-like deposits on the metal surfaces and of sludge, and viscosity growth. Suitable oxidation inhibitors include alkaline earth metal salts or alkyl-phenolthioesters having preferably $C_5$ to $C_{12}$ alkyl side chains, e.g. calcium nonylphenyl sulphide; barium octylphenyl sulphide; dioctylphenylamine; phenylalpha-naphthylamine; and phosphosulphurized or sulphurized hydrocarbons.

Other oxidation inhibitors or antioxidants which may be used in lubricating oil compositions comprise oil-soluble copper compounds. The copper may be blended into the oil as any suitable oil-soluble copper compound. By oil-soluble it is meant that the compound is oil-soluble under normal blending conditions in the oil or additive package. The copper compound may be in the cuprous or cupric form. The copper may, for example, be in the form of a copper dihydrocarbyl thio-or dithio-phosphate. Alternatively, the copper may be added as the copper salt of a synthetic or natural carboxylic acid. Examples of suitable acids include $C_8$ to $C_{18}$ fatty acids, such, for example, as stearic or palmitic acid, but unsaturated acids such, for example, as oleic acid or branched carboxylic acids such, for example, as naphthenic acids of molecular weights of from about 200 to 500, or synthetic carboxylic acids, are preferred, because of the improved handling and solubility properties of the resulting copper carboxylates. Also useful are oil-soluble copper dithiocarbamates of the general formula $R_cR_d$ $(NCSS)_zCu$, where z is 1 or 2, and $R_c$ and $R_d$ are the same or different hydrocarbyl radicals containing from 1 to 18, and preferably 2 to 12, carbon atoms, and including radicals such, for example, as alkyl, alkenyl, aryl, aralkyl, alkaryl and cycloaliphatic radicals. Particularly preferred as $R_c$ and $R_d$ groups are alkyl groups of from 2 to 8 carbon atoms. Thus, the radicals may, for example, be ethyl, n-propyl, i-propyl, n-butyl, i-butyl, sec-butyl, amyl, n-hexyl, i-hexyl, n-heptyl, n-octyl, decyl, dodecyl, octadecyl, 2-ethylhexyl, phenyl, butylphenyl, cyclohexyl, methylcyclopentyl, propenyl, or butenyl radicals. In order to obtain oil solubility, the total number of carbon atoms (i.e. the carbon atoms in $R_c$ and $R_d$) will generally be about five or greater. Copper sulphonates, phenates, and acetylacetonates may also be used.

Examples of useful copper compounds are copper $Cu^I$ and/or $Cu^{II}$ salts of alkenyl succinic acids or anhydrides. The salts themselves may be basic, neutral or acidic. They may be formed by reacting (a) polyalkylene succinimides (having polymer groups of $M_n$ of 700 to 5,000) derived from polyalkylene-polyamines, which have at least one free carboxylic acid group, with (b) a reactive metal compound. Suitable reactive metal compounds include those such, for example, as cupric or cuprous hydroxides, oxides, acetates, borates, and carbonates or basic copper carbonate.

Examples of these metal salts are Cu salts of polyisobutenyl succinic anhydride, and Cu salts of polyisobutenyl succinic acid. Preferably, the copper is in its divalent form, $Cu^{II}$. The preferred substrates are polyalkenyl succinic acids in which the alkenyl group has a number average molecular weight greater than about 700. The alkenyl group desirably has a $M_n$ from about 900 to 1,400, and up to 2,500, with a $M_n$ of about 950 being most preferred. Especially preferred is polyisobutylene succinic anhydride or acid. These materials may desirably be dissolved in a solvent, such as a mineral oil, and heated in the presence of a water solution (or slurry) of the metal-bearing material to a temperature of about 70° C. to about 200° C. Temperatures of 100° C. to 140° C. are normally adequate. It may be necessary, depending upon the salt produced, not to allow the reaction mixture to remain at a temperature above about 140° C. for an extended period of time, e.g. longer than 5 hours, or decomposition of the salt may occur.

The copper antioxidants (e.g. Cu-polyisobutenyl succinic anhydride, Cu-oleate, or mixtures thereof) will generally be employed in an amount of from about 50 to 500 ppm by weight of the copper, in the final lubricating or fuel composition.

Friction modifiers and fuel economy agents which are compatible with the other ingredients of the final oil may also be included. Examples of such materials are glyceryl monoesters of higher fatty acids, for example, glyceryl mono-oleate, esters of long chain polycarboxylic acids with diols, for example, the butane diol ester of a dimerized unsaturated fatty acid, and oxazoline compounds.

One or more additional dispersants and/or viscosity index modifier dispersants, for example selected from those described above, may also be included in a lubricating oil composition containing an additive made by the process of the invention.

Detergents and metal rust inhibitors include the metal salts, which may be overbased, of sulphonic acids, alkyl phenols, sulphurised alkyl phenols, alkyl salicylates, naphthenates, and other oil-soluble mono- and dicarboxylic acids. Overbased metal sulphonates wherein the metal is selected from alkaline earth metals and magnesium are particularly suitable for use as detergents. Representative examples of detergents/rust inhibitors, and their methods of preparation, are given in European Specification No. 208 560 A.

Antiwear agents, as their name implies, reduce wear of metal parts. Zinc dihydrocarbyl dithiophosphates (ZDDPs) are very widely used as antiwear agents. Especially preferred ZDDPs for use in oil-based compositions are those of the formula $Zn[SP(S)(OR)(OR^1)]_2$ wherein R and $R^1$ may be the same or different hydrocarbyl radicals containing from 1 to 18, and preferably 2 to 12, carbon atoms, for example, alkyl, alkenyl, aryl, aralkyl, alkaryl and cycloaliphatic radicals. Particularly preferred as R and $R^1$ radicals are alkyl radicals having 2 to 8 carbon atoms. Examples of radicals which R and $R^1$ may represent are ethyl, n-propyl, i-propyl, n-butyl, i-butyl, sec-butyl, amyl, n-hexyl, i-hexyl, n-heptyl, n-octyl, decyl, dodecyl, octadecyl, 2-ethylhexyl, phenyl, butylphenyl, cyclohexyl, methylcyclopentyl, propenyl and butenyl radicals. In order to obtain oil solubility, the total number of carbon atoms in R and $R^1$ will generally be about 5 or greater.

Pour point depressants, otherwise known as lube oil flow improvers, lower the temperature at which the fluid will flow or can be poured. Such additives are well known. Typical of those additives which improve the low temperature fluidity of the fluid are $C_8$ to $C_{18}$ dialkyl fumarate/vinyl acetate copolymers, polymethacrylates, and wax naphthalene. Foam control can be provided by an antifoamant of the polysiloxane type, for example, silicone oil or polydimethyl siloxane.

Additives prepared in accordance with the invention may where appropriate be used in lubricating oils other than engine oils. Thus, for example, some additives prepared in accordance with the invention may be suitable for use in metal-working oils.

Some of the above-mentioned additives can provide a multiplicity of effects; thus for example, a single additive may act as a dispersant-oxidation inhibitor. This approach is well known and need not be further elaborated herein.

Compositions when containing the above-mentioned additives are typically blended into the base oil in amounts which are effective to provide their normal function. Representative effective amounts of such additives for an automobile crankcase lubricant are:

| Additive | Mass % a.i.* (Broad) | Mass % a.i.* (Preferred) |
|---|---|---|
| Viscosity Modifier | 0.01–6 | 0.01–4 |
| Corrosion Inhibitor | 0.01–5 | 0.01–1.5 |
| Oxidation Inhibitor | 0.01–5 | 0.01–1.5 |
| Dispersant | 0.1–20 | 0.1–8 |
| Pour Point Depressant | 0.01–5 | 0.01–1.5 |
| Anti-Foaming Agent | 0.001–3 | 0.001–0.15 |
| Friction Modifier | 0.01–5 | 0.01–1.5 |
| Mineral or Synthetic Oil Base | Balance | Balance |

*Mass % active ingredient based on the final oil.

When a plurality of additives are employed it may be desirable, although not essential, to prepare additive concentrates comprising the additives (the concentrate being referred to herein as an additive package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive package will typically be formulated to contain the additive(s) in proper amounts to provide the desired concentration in the final formulation when the additive package is combined with a predetermined amount of base lubricant. Thus, one or more additives can be added to small amounts of base oil or other compatible solvents along with other desirable additives to form additive packages containing active ingredients in an amount, based on the additive package, of, for example, from about 2.5 to about 90 mass %, and preferably from about 5 to about 75 mass %, and most preferably from about 8 to about 50 mass % by weight, additives in the appropriate proportions with the remainder being base oil.

Three forms of mixing apparatus and reactor suitable for use in the process of the invention will now be described, by way of example only, with reference to the accompanying drawings, in which.

Figure 1:
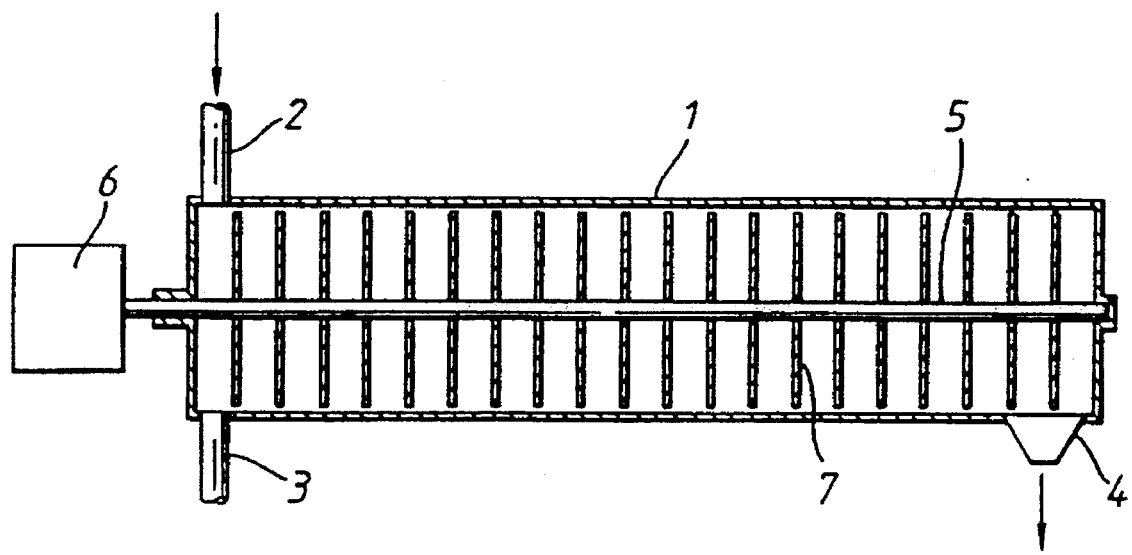
FIG. 1 is a schematic longitudinal section through one form of reactor suitable for use in accordance with the invention.
Figure 2:
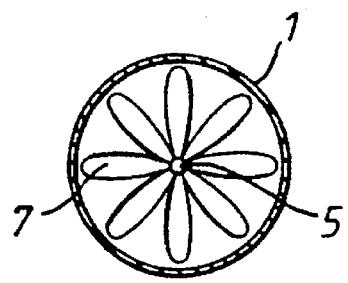
FIG. 2 is a cross-section through the reactor shown in FIG. 1.

Referring now to the drawings, the reactor shown in FIGS. 1 and 2 comprises a housing 1 having the general form of a right circular cylinder, the housing being arranged with its longitudinal axis substantially horizontal. The housing, which is closed at each end, is provided at one end (the left hand end as seen in the drawings) with inlets 2,3 for reactants to be treated in the reactor and at the other end with an outlet 4 for products of the reaction.

Within the housing, and coaxial therewith, is a shaft 5 which can be caused to rotate by drive means 6 situated outside the housing. A plurality of blades 7 extend radially outwards from the shaft, the end of each blade closer to the shaft being fixed to the shaft so that the blades rotate with the shaft. The shaft and blades thus form a rotor, which rotates relative to the housing, the housing remaining stationary during use of the reactor.

The outer extremities of the blades are adjacent to the inner surface of the housings, such that the said extremities and surface define a reaction region or zone. The width of the reaction region may be, for example, 0.2 to 10 min.

In use of the reactor, the shaft is caused to rotate at high speed, for example, 10,000 rpm. Such rotation causes reactants introduced through the inlets to form a thin film on the inner wall of the housing, reaction between the reactants taking place in this thin film. Material within the housing travels along the inner surface of the housing until it reaches the outlet, through which it is removed for any further processing that may be necessary.

Because a thin film is formed on the inner wall of the housing, the reactants are treated in accordance with the process of the invention. A further advantage of reactors in which the reactants are reacted in a thin film on an outer housing is that the temperature of the materials forming the film can be controlled by supplying heat to, or withdrawing it from, the housing.

Figure 3:
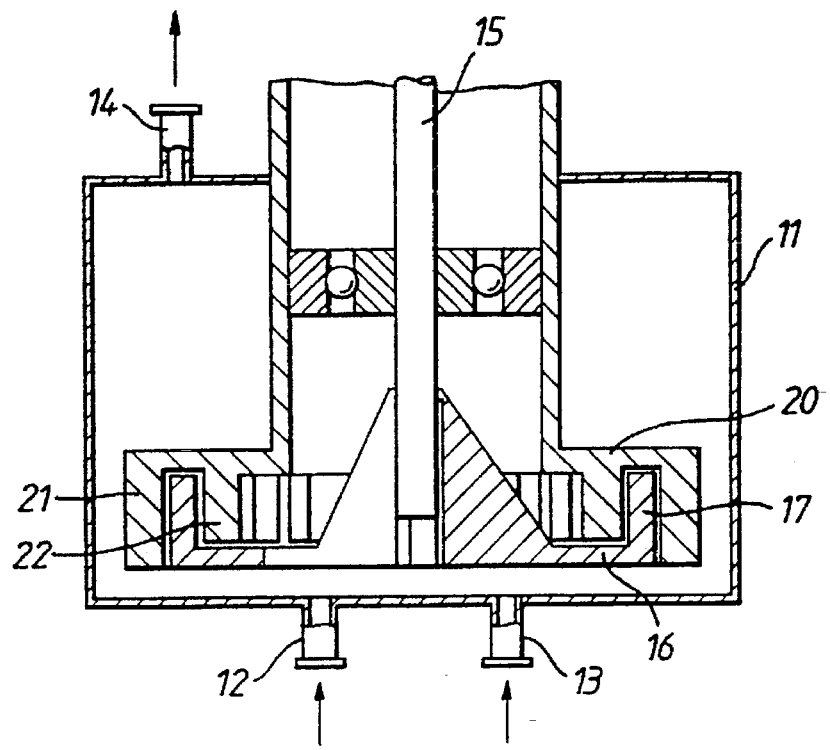
FIG. 3 is a schematic vertical section through a preferred form of reactor suitable for use in accordance with the invention.
Figure 4:
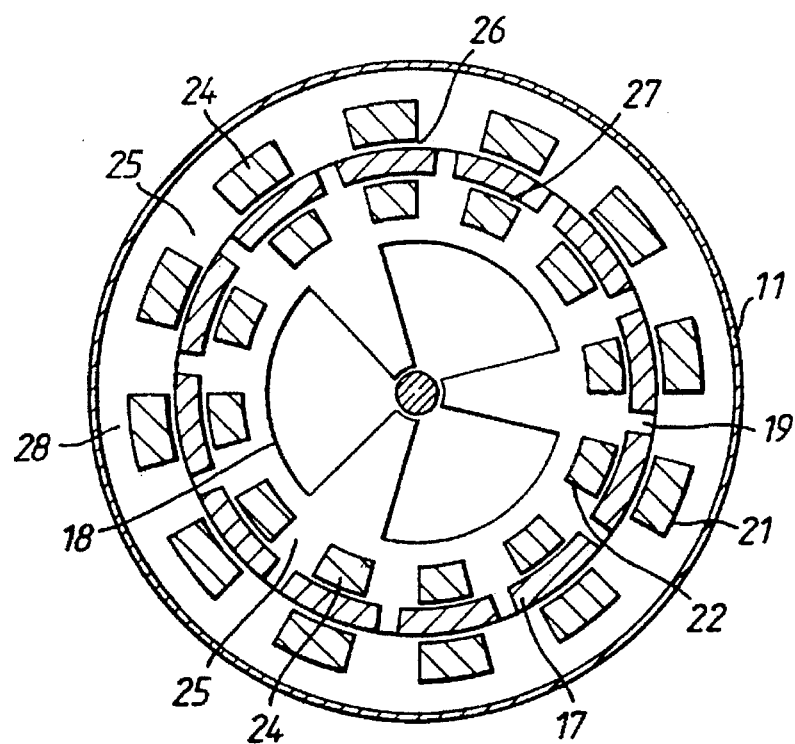
FIG. 4 is a cross-section through the reactor shown in FIG. 3.

FIGS. 3 and 4 show a reactor particularly suitable for use in accordance with the invention. The reactor shown is particularly suitable for use when working on a laboratory scale, but may readily be adapted for larger scale operation.

The reactor comprises a casing 11 in the form of a right circular cylinder, the axis of the casing extending substantially vertically. The top and bottom of the casing are closed, the bottom being provided with inlets 12 and 13 for reactants and the top being provided with an outlet 14 for material that has passed through the reactor. When working on a large scale, it may be advantageous to use an arrangement in which the axis of the casing extends generally horizontally, as in FIGS. 1 and 2.

Within the casing, and coaxial therewith, is a shaft 15, supported by a bearing, which can be caused to rotate by drive means (not shown) situated outside the casing. Attached to the lower end of the shaft is a rotor comprising a rotor disc 16 with an upwardly extending peripheral rotor flange 17. The disc is mounted on the shaft for rotational movement therewith, the shaft, disc and rotor flange thus forming a rotor. The disc is provided with three generally triangular apertures 18 therein, and the rotor flange has a plurality of circumferential openings 19 therein (most clearly seen in FIG. 4).

Also mounted in the casing is a stator comprising a stator disc 20 of larger diameter than the rotor disc 16, and two downwardly extending, circumferentially discontinuous, stator flanges 21 and 22, each of the said flanges being coaxial with the rotor flange, which extends upwardly between the two stator flanges. Each of the stator flanges comprises a plurality of wall portions 24 extending downwardly from the stator disc such that there are openings 25 between the wall portions. As will be most clearly seen in FIG. 4, the outer surface of the rotor flange is adjacent to the inner surface of the outer stator flange 21, and the inner surface of the rotor flange is adjacent to the outer surface of the inner stator flange 22, so that the rotor and stator define two annular reaction regions, indicated by the reference numerals 26 and 27, in accordance with the invention.

The outer circumferential wall of the reactor shown in FIGS. 3 and 4 may if desired be provided with a heating/cooling jacket (not shown).

In use of the reactor shown in FIGS. 3 and 4, the shaft 15 is rotated and the reactants are introduced through the inlets 12 and 13. The pumping action of the rotor causes the reactants to be drawn through the apertures 18 in the rotor disc 16 and thus into the central region of the rotor/stator arrangement. The reactants are then forced by the rotor to travel outwards in a generally radial direction, such that they pass through the inner stator flange, the rotor flange, and the outer stator flange to the zone 28 between the outer stator flange and the casing. In passing through the rotor and stator flanges, the reactants react in the annular reaction regions 26 and 27.

Material in the zone 28 passes upwardly through the casing (the upper part of the casing may, if desired, be used as a post-reaction zone), and removed via the outlet 14.

Figure 5:
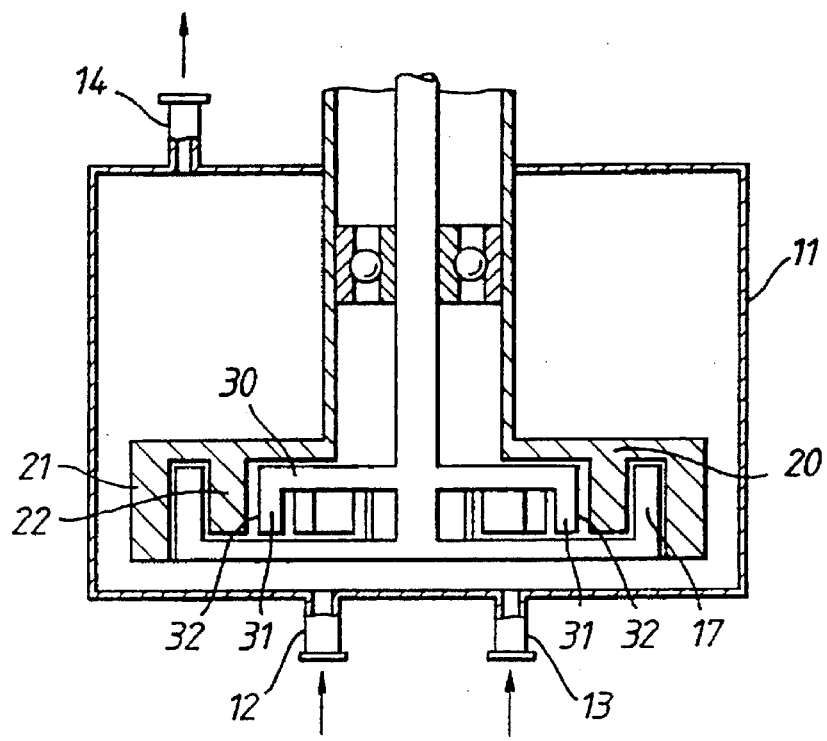
FIG. 5 is a schematic vertical section through a modification of the reactor shown in FIG. 3.
Figure 6:
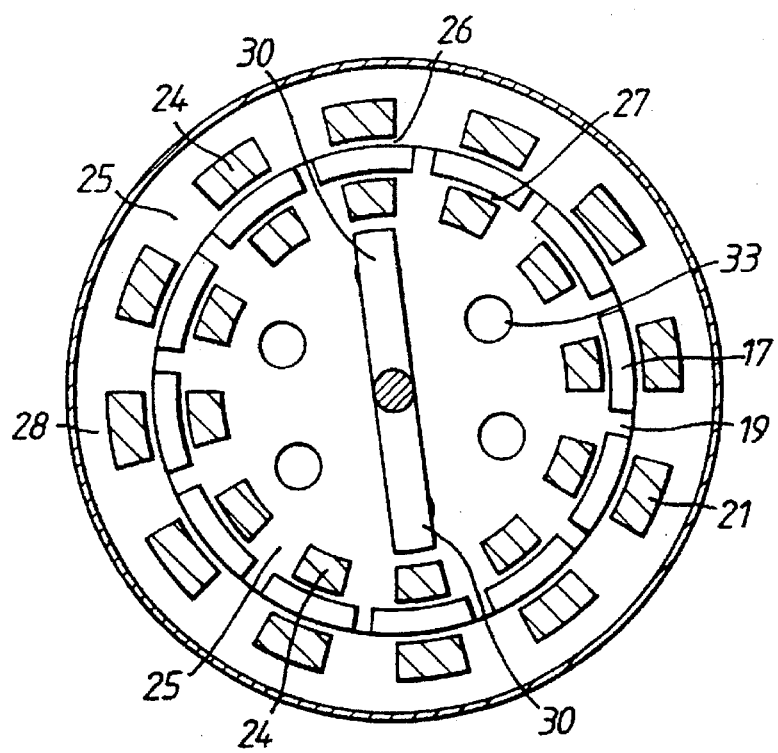
FIG. 6 is a cross-section through the reactor shown in FIG. 5.

FIGS. 5 and 6 show a modification of the reactor shown in FIGS. 3 and 4. In the reactor shown in FIGS. 5 and 6, the reactor also includes two opposed radially extending blades 30, each of which has a downwardly extending portion 31 providing a surface 32 adjacent to the inner surface of the inner stator flange 22. As shown in FIGS. 5 and 6, the blades 30 and the rotor disc 16 am both mounted on the same shaft, but if desired they could be mounted on different shafts, one extending through the top of the reactor, and one extending through the bottom.

Although the arrangement shown in FIGS. 5 and 6 has one rotor flange and two stator flanges, arrangements with additional rotor and stator flanges may be used if desired, thus increasing the number of reaction regions in accordance with the invention. Thus, for example, in some circumstances an arrangement with two upwardly extending rotor flanges and three downwardly extending stator flanges has been found to be advantageous.

In the reactor shown in FIGS. 5 and 6, the apertures 18 shown in FIGS. 3 and 4 are replaced by a plurality of circular apertures 33.

The following Examples illustrate the invention. In the Examples the reactor used in accordance with the invention was substantially as described with reference to FIGS. 3 and 4 of the accompanying drawings. The reactor had the following characteristics:

Diameter of volume swept by rotor=40.5 mm
Gap between rotor and each stator=0.25 mm
Speed of rotation of rotor=10,000 rpm

EXAMPLE 1

Polyisobutene (PIB) having a number average molecular weight of 952 was fed continuously through a rotary pump to the reactor used in accordance with the invention, the flow rate being 37.8 g/min. Gaseous chlorine was separately fed through a flow meter at a rate of 3.9 g/min, corresponding to molar ratio Cl:PIB of 1.4:1. The reactants in the reactor were maintained at a temperature of 100° C., and the residence time in the reaction region of the reactor was 1.2 mins. The residence time was defined as:

$$\text{Residence time} = \frac{\text{volume of reaction region}}{\text{flow rate of reactants}}$$

A PIB chloride with a chlorine content of 4.9 mass % was obtained in almost quantitative yield (98 to 99%) at a production rate of 2500 g/h. The chloride was outstandingly bright and clear, showing that side reactions such as cracking had not taken place. Backbone chlorination, occurring as a result of a free radical mechanism was substantially prevented; ionic chlorination, selective to the allylic position, was predominant.

EXAMPLE 2

Using the procedure described in Example 1, polyisobutene having a number average molecular weight of 2205 was chlorinated at an extent corresponding to a Cl:PIB molar ratio of 1.5:1. The flow rate of the PIB was 39.8 g/min and that of the chlorine was 1.9 g/min, giving a residence time of 1.2. A PIB chloride with a chlorine content of 2.3 mass % was obtained in almost quantitative yield (98 to 99%) at a rate of 2500 g/h. As in Example 1, the product was outstandingly bright and clear.

Examples 1 and 2 shows that the change from a PIB of number average molecular weight 952 (kinematic viscosity= 230 cSt ($2.3\times10^{-4}$m$^2$/s)) to a PIB of number average molecular weight 2205 (kinematic viscosity=2300 cSt ($22.3\times10^{-4}$m$^2$/s)) can be carded out without changing the reaction conditions required to obtain substantially quantitative yields.

EXAMPLE 3

A mixture of PIBCl prepared in accordance with Example 1 and maleic anhydride (MA) (mass ratio MA:PIBCl= 0.134:1) homogenised in a stirred vessel at 80° C. was fed to the reactor used in accordance with the invention at a flow rate of 12.5 g/min, corresponding to a residence time of 4 mins. HCl produced in the course of the action was removed and scrubbed using a caustic medium. With the contents of the reactor at 190° C., a mixture with the following characteristics was obtained:

Residual chlorine=1.19 mass %
Saponification number=64.0 mg KOH/g
Process yield=57.1%

(A residual chlorine content lower than 0.3 mass % indicates that the reaction is close to completion; a saponification number of 112 mg KOH/g indicates that MA is bonded to the PIB at a 1:1 molar ratio; the process yield is defined as $$\frac{\text{experimental saponification no.}}{\text{target saponification no. (112)}} \times 100\%.)$$

The partially converted mixture was then transferred to a continuous stirred tank reactor (CSTR) and maintained at 220° C. for 2 hours. The product was a PIBSA containing 0.18 mass % residual chlorine and having a saponification number of 106 mg KOH/g and a kinematic viscosity of 800 cSt ($8\times10^{-4}$m$^2$/s). The proportion of PIB functionalised with succinic groups, calculated on the total mass of PIB, was 85.3%. The final process yield was 94.6%, and the rate of production of the PIBSA was about 430 g PIBSA per hour.

EXAMPLE 4

Example 3 was repeated, but maintaining the contents of the reactor at 230° C. The partially converted mixture contained 0.46 mass % chlorine and had a saponification number of 85 mg KOH/g. The partial process yield was 75.9%.

The partially converted mixture was treated as in Example 3. The product was a PIBSA containing 0.2 mass % chlorine and having a saponification number of 106 mg KOH/g and a kinematic viscosity of 769 cSt ($7.69\times10^{-4}$m$^2$/s). The proportion of PIB functionalised with succinic groups was 83.1 mass %, and the final process yield was 94.6%. The rate of production of PIBSA was about 570 g PIBSA per hour.

COMPARATIVE EXAMPLE 1

50 g of the reaction mixture used in Example 3, with the reactants in the same proportions, were introduced into a discontinuous stirred tank reactor. After 6 hours a PIBSA containing 0.08 mass % chlorine and having a saponification number of 114.8 mg KOH/g and a kinematic viscosity of 760 cSt ($7.60\times10^{-4}$m$^2$/s) was obtained. The proportion of PIB functionalised with succinic groups was 87.5 mass %. A process yield of 103.3% was obtained, corresponding to a rate of production of 8.6 g PIBSA per hour at 230° C. very considerably less than that obtained in Examples 3 and 4.

A mixture of PIBCl prepared in accordance with Example 2 and maleic anhydride (mass ratio MA:PIBCl=0.057:1) homogenised in a stirred vessel was treated as described in Example 3. The flow rate and the residence time were the same as in Example 3. The target saponification number was 48 mg KOH/g.

With the contents of the reactor at 160° C. a PIBSA containing 0.96 mass % chlorine and having a saponification number of 24 mg KOH/g was obtained. The process yield was 50.0%.

The mixture was maintained at 230° C. for 2 hours in a CSTR. The product was a PIBSA containing 0.22 mass % chlorine and having a saponification number of 45.3 mg KOH/g and a kinematic viscosity of 2817 cSt ($28.17\times10^{-4}$m$^2$/s). The final process yield was 94.4%.

EXAMPLE 6

Example 4 was repeated with the contents of the reactor maintained at 230° C. The partially converted mixture contained 0.33 mass % chlorine and had a saponification number of 35 mg KOH/g. The partial process yield was 72.9%.

The partially converted mixture was maintained at 230° C. for 2 hours in a CSTR. The product was a PIBSA containing 0.11 mass % chlorine, and having a saponification number of 44.5 mg KOH/g and a kinematic viscosity of 2433 cSt ($24.33 \times 10^{-4} m^2/s$). The final process yield was 92.7%.

EXAMPLE 7

A mixture of PIBCl (molecular weight of starting PIB=952; chlorine content=5.2 mass %) and maleic anhydride (mass ratio MA:PIBC=0.144:1) was treated as described in Example 3 except that the residence time was 5 mins and the pressure in the reactor was 2.4 bar ($2.4 \times 10^5 Pa$). A PIBSA containing 0.38 mass % residual chlorine and having a saponification number of 98 mg KOH/g was obtained. The final process yield was 87.5%.

EXAMPLE 8

Example 7 was repeated, but with a residence time of 16 mins. The PIBSA obtained contained 0.45 mass % residual chlorine and had a saponification number of 109 mg KOH/g. The process yield was 97.3%.

EXAMPLE 9

A PIBSA having a saponification number of 112 mg KOH/g and derived from PIB with a number average molecular weight of 952 was diluted with base oil and fed via a rotary pump to the reactor used according to the invention. A mixture of polyamines (PAMs), mainly tetraethylene pentamine and related compounds (isomers or major homologues), having a total nitrogen content of 33.5 mass % and a primary nitrogen content of at least 10 mass %, was fed separately to the reactor via a peristaltic pump. For each 100 g of PIBSA, 50 g of base oil and 8.2 g of the PAMs were used, the flow rate of the diluted PIBSA being 36.5 g/min and that of the PAMs being 2.0 g/min. The contents of the reactor were maintained at a temperature of 150° C., and the residence time was 1.3 min.

A PIBSA-PAM was obtained in almost quantitive yield (98–99%) at a production rate of about 2300 g/hour. The nitrogen content was 1.70 mass % and the kinematic viscosity was 503 cSt ($5.03 \times 10^{-4} m^2/s$).

The PIBSA-PAM was then reacted with $H_3BO_3$ slurried with oil (3.5 g $H_3BO_3$ and 24.7 g oil for each 100 g PIBSA used as starting material). The PIBSA-PAM was fed to the reactor used in accordance with the invention at a flow rate of 12.5 g/min, while the flow rate of the slurried $H_3BO_3$ was 2.2 g/min. The residence time was 3.4 min.

A borated dispersant was obtained in almost quantitative yields (98–99%) at a rate of about 900 g/hour. The sediment level was 0.02%, indicating that almost all the solid $H_3BO_3$ had reacted. The borated dispersant contained 1.59 mass % nitrogen and 0.32 mass % boron and had a kinematic viscosity of 265 cSt ($2.65 \times 10^{-4} m^2/s$).

We claim:

1. A process for the manufacture of a functionalised polymer suitable for use as a lubricating or fuel oil additive, or as an intermediate for use in the manufacture of such an additive, in which process a first reactant is present in a different phase from a second reactant, the first reactant comprises a polymeric substance containing a carbon-carbon backbone, and optionally containing a functional group, and the second reactant comprises a compound capable of introducing a functional group into the polymeric substance, and/or of modifying an existing functional group, the process comprising the step of reacting a mixture of the reactants in an apparatus comprising a reaction region defined by a surface and at least one member adjacent to the surface, the surface and the member(s) being separated by a distance of at most 25 mm, wherein the reactants are caused to move relative to the surface by relative movement between the surface and the member(s), and wherein a major part of each of the reactants is treated in the reaction region.

2. A process as claimed in claim 1, wherein the reaction region is defined by adjacent surfaces separated by a distance of at most 25 mm between which there is relative movement such that the reactants are caused to move relative to one or both of the surfaces.

3. A process as claimed in claims 1 or 2, wherein the reactants form a thin film in the reaction region, the average velocity (taken across the thickness of the film) of the mixture of the reactants in a direction parallel to the surface over which they move being at least 1 m/sec.

4. A process as claimed in claim 3, wherein the surface and the member(s), or the two surfaces, are separated by a distance of 0.1 to 10 min.

5. A process as claimed in claim 4, wherein one of the surfaces is a surface of an inner body and the other surface is a surface of an outer housing, one of the inner body and the outer housing being a rotor, and the other being a stator.

6. A process as claimed in claim 5, wherein the inner body is a rotor and, in use, has a peripheral speed of 20 to 30 m/sec.

7. A process as claimed in claim 6, wherein the inner body and/or the outer body has one or more apertures or discontinuities therein.

8. A process as claimed in claim 7, wherein the inner body comprises a plurality of rotors and the outer body comprises a plurality of stators.

9. A process as claimed in claim 8, wherein the rotor(s) and stator(s) form part of a reactor which is provided with one or more inlets and one or more outlets, and the rotor(s), stator(s), inlet(s) and outlet(s) are so arranged that the reactants can be introduced in an axial direction to the centre of the rotor/stator arrangement and can pass radially through at least one rotor or stator before leaving the reactor.

10. A process as claimed in claim 1, which is carried out in a continuous manner.

11. A process as claimed in claim 1, wherein at least 75% of each of the reactants is treated in the reaction region.

12. A process as claimed in claim 1, in which the reactants and/or reaction product(s) are also subjected to a soaking step.

13. A process as claimed in claim 1, wherein the functionalised polymer comprises at least one member selected from the group consisting of an ashless dispersant, a viscosity index modifier dispersant, and intermediates for use in the manufacture of such dispersants.

14. A process as claimed in claim 13, wherein the functionalised polymer comprises an ashless dispersant selected from the group consisting of a carboxylic dispersant, an amine dispersant, a Mannich dispersant, a post-treated carboxylic, amine or Mannich dispersant, and a polymeric dispersant.

15. A process as claimed in claim 14, wherein the first reactant comprises a polyolefin.

16. A process as claimed in claim 15, wherein the second reactant comprises a halogenating agent.

17. A process as claimed in claim 15, wherein the second reactant comprises a monounsaturated dicarboxylic acid or a derivative thereof.

18. A process as claimed in claim 17, wherein chlorine is also present as a third reactant.

19. A process as claimed in claim 14, wherein the first reactant comprises a halogenated olefin polymer and the second reactant comprises a monounsaturated dicarboxylic acid or a derivative thereof, or an amine.

20. A process as claimed in claim 14, wherein the first reactant comprises a hydrocarbyl-substituted dicarboxylic acid or a derivative thereof, and the second reactant comprises an amine, an alcohol or an amino alcohol.

21. A process as claimed in claim 14, wherein the first reactant is a carboxylic, amine or Mannich dispersant, and the second reactant is a post-treating agent for such a dispersant.

22. A process as claimed in claim 21, wherein the post-treating agent is a boron compound.

23. A process as claimed in claim 1, wherein each of the first and second reactants, independently, is present in the reaction mixture as a liquid or solid.

24. A process as claimed in claim 23, wherein a third, gaseous, reactant is also present.

* * * * *